United States Patent
Jeon et al.

(10) Patent No.: US 10,812,542 B2
(45) Date of Patent: Oct. 20, 2020

(54) METHOD AND DEVICE FOR FUNCTION SHARING BETWEEN ELECTRONIC DEVICES

(71) Applicant: Samsung Electronics Co., Ltd., Suwon-si, Gyeonggi-do (KR)

(72) Inventors: Yong-Joon Jeon, Hwaseong-si (KR); Geon-Soo Kim, Suwon-si (KR); Dong-Hyun Yeom, Bucheon-si (KR); Min-Kyung Hwang, Seoul (KR); Eun-Seok Ryu, Seongnam-si (KR); Cheol-Ho Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 14/944,558

(22) Filed: Nov. 18, 2015

(65) Prior Publication Data

US 2016/0156682 A1   Jun. 2, 2016

(30) Foreign Application Priority Data

Nov. 28, 2014   (KR) .................. 10-2014-0169066

(51) Int. Cl.
*G06F 15/16* (2006.01)
*H04L 29/06* (2006.01)
(Continued)

(52) U.S. Cl.
CPC ............ *H04L 65/403* (2013.01); *G06F 1/163* (2013.01); *H04L 65/1069* (2013.01);
(Continued)

(58) Field of Classification Search
CPC . H04L 12/2805; H04L 49/70; H04L 65/4084; H04L 67/2823; H04L 29/06;
(Continued)

(56) References Cited

U.S. PATENT DOCUMENTS 7,376,693 B2 *  5/2008  Neiman ................ G06F 9/4843
                                                    709/201
8,060,588 B2 * 11/2011  Yook ................... H04L 12/2805
                                                    709/205
(Continued)

FOREIGN PATENT DOCUMENTS

CN          1512708 A      7/2004
CN          1817005 A      8/2006
(Continued)

OTHER PUBLICATIONS

Li et al., A Distributed Consensus Algorithm for Decision Making in Service-Oriented Internet of Things, IEEE Transactions on Industrial Informatics, May 2014, pp. 1461-1468, vol. 10, No. 2.
(Continued)

*Primary Examiner* — Dustin Nguyen
(74) *Attorney, Agent, or Firm* — Jefferson IP Law, LLP

(57) ABSTRACT

An electronic device and a method are provided. The electronic device includes a first service in response to a service request by a first electronic device, identifying at least one function relating to the first service, which is available in a second electronic device external to the first electronic device, and providing a second service relating to the service request on the basis of the at least one function. Other embodiments may be made.

17 Claims, 10 Drawing Sheets

(51) Int. Cl.
*H04W 4/80* (2018.01)
*H04L 29/08* (2006.01)
*H04W 4/02* (2018.01)
*G06F 1/16* (2006.01)

(52) U.S. Cl.
CPC ............ H04L 67/16 (2013.01); H04L 67/303 (2013.01); H04W 4/023 (2013.01); H04W 4/80 (2018.02)

(58) Field of Classification Search
CPC ....... H04L 67/00; H04L 67/16; H04L 65/403; H04L 67/1002; H04N 21/43615; H04N 21/43637; G06F 9/4843; G06F 11/3051; G06F 9/5044; G06F 16/78; H04W 8/005; H04W 12/06; H04W 72/042; H04W 4/023; H04M 1/7253
See application file for complete search history.

(56) References Cited

U.S. PATENT DOCUMENTS

| | | | |
|---|---|---|---|
| 8,775,497 B2* | 7/2014 | Okamori | G06F 9/5044 709/201 |
| 8,886,169 B2* | 11/2014 | Hussain | H04W 4/023 455/414.1 |
| 2001/0049731 A1 | 12/2001 | Kuusinen et al. | |
| 2003/0208595 A1* | 11/2003 | Gouge | H04L 67/16 709/225 |
| 2004/0139320 A1 | 7/2004 | Shinohara | |
| 2004/0205153 A1* | 10/2004 | Weisshaar | H04L 29/06 709/217 |
| 2005/0285730 A1 | 12/2005 | Turner | |
| 2006/0245383 A1* | 11/2006 | Ansari | H04M 1/7253 370/310 |
| 2007/0185597 A1 | 8/2007 | Bejean et al. | |
| 2007/0189321 A1 | 8/2007 | Lee et al. | |
| 2008/0220767 A1 | 9/2008 | Aretz et al. | |
| 2008/0250096 A1* | 10/2008 | Koide | H04N 21/43637 709/201 |
| 2009/0285130 A1 | 11/2009 | Knaz | |
| 2010/0130240 A1* | 5/2010 | Hart | H04W 8/005 455/509 |
| 2010/0131627 A1 | 5/2010 | Son et al. | |
| 2010/0173585 A1 | 7/2010 | Button et al. | |
| 2010/0318643 A1* | 12/2010 | Du | H04L 67/2823 709/223 |
| 2011/0047214 A1 | 2/2011 | Lee et al. | |
| 2011/0145859 A1* | 6/2011 | Novack | H04N 21/43615 725/38 |
| 2011/0273526 A1 | 11/2011 | Mehin et al. | |
| 2012/0079507 A1 | 3/2012 | Agarwal et al. | |
| 2012/0084248 A1 | 4/2012 | Gavrilescu | |
| 2012/0124128 A1 | 5/2012 | Vonog et al. | |
| 2012/0254382 A1 | 10/2012 | Watson et al. | |
| 2012/0315901 A1 | 12/2012 | Un et al. | |
| 2013/0053053 A1 | 2/2013 | Agarwal et al. | |
| 2013/0097289 A1* | 4/2013 | Alsterlid | H04L 67/00 709/219 |
| 2013/0130726 A1 | 5/2013 | Deng et al. | |
| 2013/0145048 A1 | 6/2013 | Lee et al. | |
| 2013/0159490 A1 | 6/2013 | Huh et al. | |
| 2013/0246611 A1* | 9/2013 | Kim | H04L 67/16 709/224 |
| 2013/0332834 A1* | 12/2013 | Li | G06F 16/78 715/719 |
| 2014/0020025 A1 | 1/2014 | Anderson et al. | |
| 2014/0033056 A1 | 1/2014 | Kim et al. | |
| 2014/0047487 A1* | 2/2014 | Guedalia | H04N 21/43615 725/80 |
| 2014/0066062 A1 | 3/2014 | Chen et al. | |
| 2014/0073321 A1* | 3/2014 | Kuusilinna | H04L 67/16 455/434 |
| 2014/0122729 A1 | 5/2014 | Hon et al. | |
| 2014/0126543 A1 | 5/2014 | Yao et al. | |
| 2014/0241354 A1 | 8/2014 | Shuman et al. | |
| 2014/0273963 A1* | 9/2014 | Su | H04W 12/06 455/411 |
| 2014/0301270 A1* | 10/2014 | Johnsson | H04W 72/042 370/328 |
| 2014/0310348 A1* | 10/2014 | Keskitalo | H04L 65/4084 709/204 |
| 2015/0031292 A1* | 1/2015 | Holman | H04M 1/7253 455/41.2 |
| 2015/0031297 A1* | 1/2015 | Holman | H04W 8/005 455/41.2 |
| 2015/0085870 A1* | 3/2015 | Narasimha | H04L 49/70 370/409 |
| 2015/0163096 A1 | 6/2015 | Lee et al. | |
| 2015/0172330 A1* | 6/2015 | Kaplan | H04L 65/403 709/206 |
| 2015/0264139 A1* | 9/2015 | Son | H04L 67/1002 709/208 |
| 2016/0085654 A1* | 3/2016 | Khoury | G06F 11/3051 710/17 |

FOREIGN PATENT DOCUMENTS

| | | |
|---|---|---|
| CN | 101159570 A | 4/2008 |
| CN | 101674110 A | 3/2010 |
| CN | 102440011 A | 5/2012 |
| CN | 102484779 A | 5/2012 |
| CN | 103944968 A | 7/2014 |
| KR | 10-2007-0082209 A | 8/2007 |
| KR | 10-0901504 B1 | 6/2009 |
| KR | 10-0966594 B1 | 6/2010 |
| KR | 10-1173558 B1 | 8/2012 |
| KR | 10-2013-0065859 A | 6/2013 |
| KR | 10-2014-0003043 A | 1/2014 |
| KR | 10-2014-0014551 A | 2/2014 |
| WO | 2014/131038 A | 8/2014 |

OTHER PUBLICATIONS

Kang et al., Orchestrator: An Active Resource Orchestration Framework for Mobile Context Monitoring in Sensor-Rich Mobile Environments, 2010 IEEE International Conference on Pervasive Computing and Communications (PERCOM), Mar. 29, 2010, pp. 135-144, 978-1-4244-5328-3/09.
Chinese Office Action dated Nov. 18, 2019, issued in Chinese Patent Application No. 201510848988.1.

* cited by examiner

METHOD AND DEVICE FOR FUNCTION SHARING BETWEEN ELECTRONIC DEVICES

CROSS-REFERENCE TO RELATED APPLICATION(S)

This application claims the benefit under 35 U.S.C. § 119(a) of a Korean patent application filed on Nov. 28, 2014 in the Korean Intellectual Property Office and assigned Serial number 10-2014-0169066, the entire disclosure of which is hereby incorporated by reference.

TECHNICAL FIELD

The present disclosure relates to a method and device for function sharing between electronic devices.

BACKGROUND

Electronic devices may provide a variety of services, and portable electronic devices, such as, for example, smartphones or tablet computers, have developed to afford much more convenience to users while implementing various capabilities. Since there may be suitable electronic devices according to the types, functions, or service environments thereof, various forms of electronic devices may be located in a predetermined space. Users may use one of the various forms of electronic devices according to the type of service.

Electronic devices may be interconnected over wired/wireless communications in a predetermined space and may establish a local network indoors or outdoors. In addition, the electronic devices incorporated in such a local network may be connected to another external network or another electronic device over wired/wireless communications. A network constituted with a plurality of electronic devices may not only establish physically distinguished groups including spatial separation, but may also establish, for example, various virtual groups such as the types or users of the electronic devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

Another aspect of the present disclosure is to provide an electronic device may provide depending upon the type and capability of the corresponding electronic device. For example, according to existing technologies, a service or an application that an electronic device provides is not automatically changed depending upon the state information of the electronic device or another electronic device. For instance, in cases where a user wants a service that cannot be provided via an electronic device which he/she carries, the user may be provided with the desired service by accessing (e.g., operating) another suitable electronic device.

Furthermore, even through the user is in a communication system incorporating a plurality of electronic devices, the conversion of a service between the electronic devices requires the interruption of an existing service and a request for a new service, which may cause damage to data used in the existing service and need the user's repetitive tasks. Various embodiments of the present disclosure may provide a device and method that may select available resources in various manners and manage services and resources inside/outside an electronic device using the selected resources.

In accordance with an aspect of the present disclosure, an electronic device is provided. The electronic device includes a service providing module configured to provide a first service in response to a service request, a function identification module configured to identify at least one function relating to the first service, which is available in another electronic device external to the electronic device; and a service change module configured to provide a second service relating to the service request on the basis of the at least one function.

In accordance with an aspect of the present disclosure, a method is provided. The method includes providing a first service in response to a service request by a first electronic device, identifying at least one function relating to the first service, which is available in a second electronic device external to the first electronic device, and providing a second service relating to the service request on the basis of the at least one function.

In accordance with an aspect of the present disclosure, a non-transitory computer readable storage medium having stored thereon a program, the program executed by at least one processor to perform a method. The method includes providing a first service in response to a service request by a first electronic device, identifying at least one function relating to the first service, which is available in a second electronic device external to the first electronic device, and providing a second service relating to the service request on the basis of the at least one function.

In accordance with an aspect of the present disclosure, an electronic device is provided. The electronic device includes a first identification module configured to identify a first service performed in a first external device, a second identification module configured to identify state information of at least one of the first external device and a second external device, and a change module configured to change the first service into a second service on the basis of the state information of at least one of the first external device and the second external device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
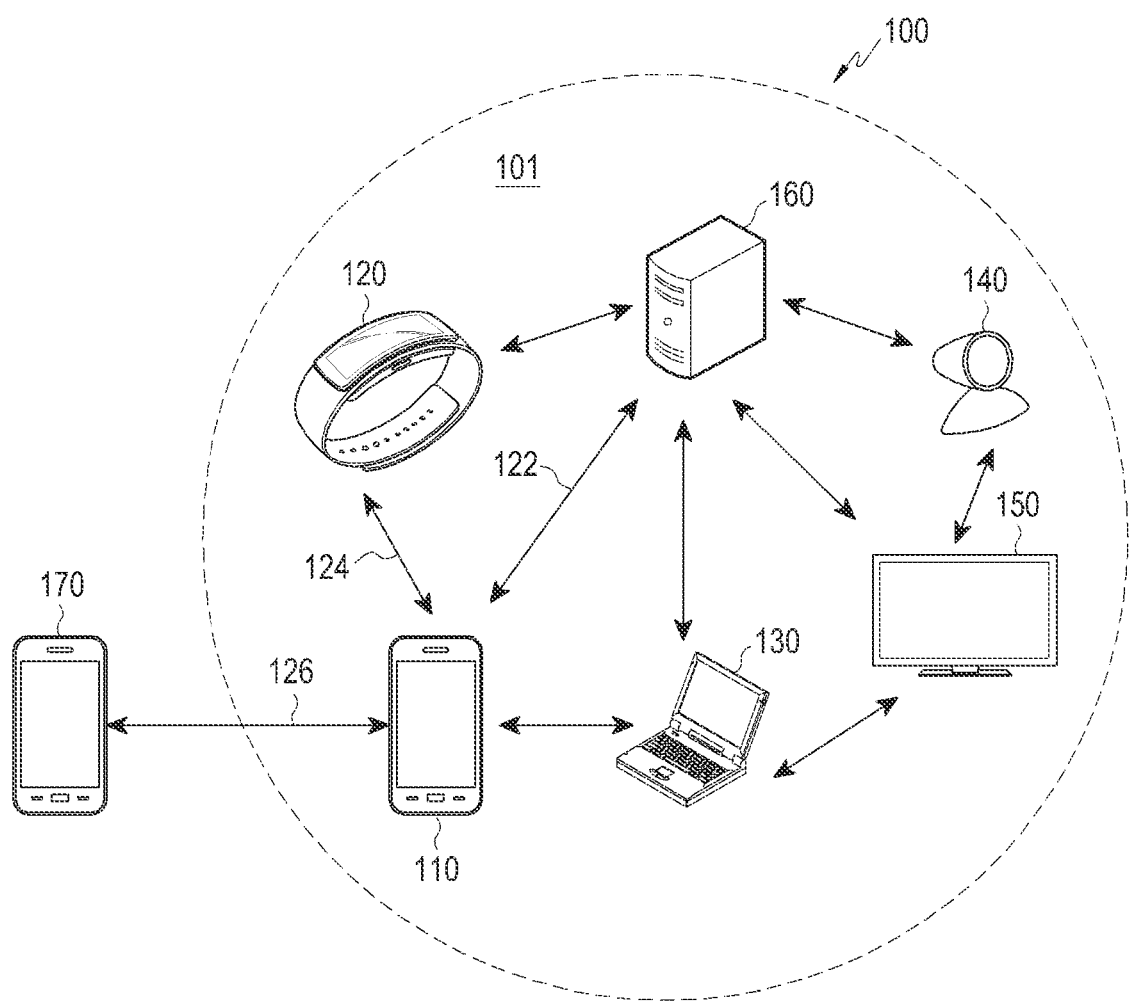
FIG. 1 illustrates a network environment device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

The "specified" used in the present document may include meaning of, for example, the "predetermined" or the "specific" according to a situation.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that may perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or a tattoo), and a bio-implantable type (e.g., an implantable circuit).

According to some embodiments, the electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, and the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, and the like).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology An electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a communication system in a network environment, according to various embodiments of the present disclosure.

Referring to FIG. 1, a communication system 101 in a network environment 100, according to this embodiment, may include, for example, a first electronic device 110, a second electronic device 120, a third electronic device 130, a fourth electronic device 140, a fifth electronic device 150, and a sixth electronic device 160. In FIG. 1, for convenience of description, examples of the electronic devices incorporated in the communication system 101 include a handheld device 110, a wearable device 120, a security device 130, a camera device 140, a home appliance 150, and a server 160. However, the types and number of electronic devices are not limited thereto. The network environment 100 may further include, for example, a seventh electronic device 170 external to the communication system 101. According to some embodiments, the first to seventh electronic devices 110, 120, 130, 140, 150, 160 and 170 may be the same or almost the same electronic devices. According to some embodiments, at least some of the first to seventh electronic devices 110, 120, 130, 140, 150, 160 and 170 may be different types of electronic devices, or may be electronic devices including at least different elements.

The communication system 101 may be, for example, a home network system or a cloud system that is constituted in units of homes, offices, stores, and the like. The electronic devices incorporated in the communication system 101 may exchange information through wired/wireless networks in a predetermined space and, for example, technologies, such as Ethernet, power line communication (PLC), IEEE 1394, WLAN, WPAN, home server, home gateway, and the like, may be used. Furthermore, for instance, the communication system 101 may also constitute at least a part of a personal cloud system or a hybrid cloud system based on a server, storage, an Infra as a Service (IaaS), a platform as a service (PaaS), and a software as a service (SaaS). The first to sixth electronic devices 110, 120, 130, 140, 150 and 160, incorporated in the communication system 101, may be interconnected through one or more communication links (e.g., a first communication link 122 or a second communication link 124). For example, the first electronic device 110 may be connected to the sixth electronic device 160 through the first communication link 122 (e.g., a network), or may be directly connected to the second electronic device 120 through the second communication link 124 (e.g., device to device (D2D) communication).

According to an embodiment, the first to sixth electronic devices 110, 120, 130, 140, 150 and 160 interconnected in the communication system 101 may exchange information, with at least one electronic device (e.g., the sixth electronic device 160) as the center thereof. For example, the first electronic device 110 may provide, to the sixth electronic device 160, information on functions (e.g., a camera function, a speaker function, or a microphone function) or applications (e.g., a telephone call application, a gallery application, or a health care application) that are executable in the first electronic device 110. According to an embodiment, the sixth electronic device 160 may provide the information on the first electronic device 110 to the second to fifth electronic devices 120, 130, 140 and 150, whereby the first to sixth electronic devices 110, 120, 130, 140, 150 and 160 interconnected in the communication system 101 may share information on functions or applications thereof with each other.

According to an embodiment, the sixth electronic device 160 may forward information acquired from at least one electronic device (e.g., the first electronic device 110) to an electronic device at an adjacent location to a user (e.g., within the service coverage of the communication system 101). For instance, in cases where the user wears the second electronic device 120, the sixth electronic device 160 may provide the information acquired from the first electronic device 110 to the second electronic device 120.

In some embodiments, using the information acquired from the first electronic device 110, the sixth electronic device 160 may create other pieces of information associated with the information. In addition, the sixth electronic device 160 may transmit the newly created information to another electronic device (e.g., the fifth electronic device 150). In some embodiments, the role of the sixth electronic device 160 may be performed by the other electronic devices incorporated in the communication system 101. Or, in some embodiments, transmission electronic devices and reception electronic devices may also perform operations according to embodiments disclosed in this document without the sixth electronic device 160, confirming with a predetermined protocol.

The sixth electronic device 160 may be, for example, a server that controls interfaces between the first to fifth electronic devices 110, 120, 130, 140 and 150 incorporated in the communication system 101. In addition, for example, when an electronic device registered in the communication system 101 wants to connect with the inside of the communication system 101 from the outside thereof, the sixth electronic device 160 may perform processing related to that. According to an embodiment, the sixth electronic device 160 may perform at least a part of operations relating to the embodiments disclosed in this document. Although the term "server" is used herein for convenience of description, the server may be replaced by devices with different names (e.g., a home gateway, a personal cloud device, a cloud device, and the like) that may perform the embodiments disclosed in this document and operations equivalent thereto.

According to various embodiments disclosed in this document, the first to sixth electronic devices 110, 120, 130, 140, 150 and 160 incorporated in the communication system 101 may provide a variety of services using one or more functions included therein. The services provided by the electronic devices are not limited to examples described in this document and, for example, may be tangible/intangible benefits that the electronic devices provide to users or other electronic devices using the electronic devices and peripheral devices thereof. The services may be, for example, software components having functional meanings.

For instance, there are various services that may provide convenience to users or other electronic devices, such as internet of things (IoT) service, an internet of everything (IoE) service, a social network service (SNS), a cloud service, a health care service, a location based service (LBS), an e-mail service, a communication service, and the like. The types of services which may be provided by the communication system 101 may include, for example, a voice call service, a video call service, a message transmission/reception service (e.g., a short message service, a multimedia message service, an instant message service, an e-mail service, and the like) a filming service, a content streaming service, an application update service, a data synchronization service, a medical service, and the like, in addition to the above disclosed services.

The services provided by the electronic devices, for example, may be accompanied by the execution of applications (or programs). An electronic device, according to various embodiments disclosed in this document, may execute an application using functions included in the electronic device or at least one other electronic device. The functions used in the execution of the application may also be managed as resources that are used in the communication system 101 in order to provide a service. The functions or resources may be used, for example, to input/output data (or information) or instructions, and may include hardware devices such as a camera, a microphone, a speaker, a sensor, a motor, a display, a communication module, a touch screen, and the like, or may include software/hardware programs for performing specific instructions. Although the types of services and functions described above are described as examples for explaining various embodiments of this document, various modifications may be made without being limited thereto.

According to an embodiment, at least one (e.g., the first electronic device 110) of the first to sixth electronic devices 110, 120, 130, 140, 150 and 160 incorporated in the communication system 101 may be connected to the seventh electronic device 170, which is a device external to the communication system 101, through a third communication link 126. According to various embodiments, the seventh electronic device 170 may request a connection from the first electronic device 110, incorporated in the communication system 101, through the third communication link 126. The first electronic device 110, having received the connection request of the seventh electronic device 170, may establish a connection with the third electronic device 130 automatically or in response to a user input and provide a service requested by the first or seventh electronic device 110 or 170 to the first or seventh electronic device 110 or 170. Additionally or alternatively, the first electronic device 110 may also provide a service, for example, on the basis of an execution command for an application which is input by a user of the first electronic device 110.

According to an embodiment, the first electronic device 110 may identify at least one function that is available in another electronic device (e.g., the fifth electronic device 150) incorporated in the communication system 101, on the basis of the service requested from the seventh electronic device 170. For example, the first electronic device 110 may select one or more functions for providing the service requested from the user or the seventh electronic device 170, among functions included in the first electronic device 110 and the another electronic device (e.g., the fifth electronic device 150). Accordingly, if a function necessary for the requested service is not available in the first electronic device 110, the first electronic device 110 may provide the requested service using at least one function available in the another electronic device (e.g., the fifth electronic device 150). For instance, the first electronic device 110 may change a service requested from the seventh electronic device 170 to another service using a function of at least one of the first to sixth electronic devices 110, 120, 130, 140, 150 and 160 incorporated in the communication system 101 and provide the changed service to the user.

For example, the first electronic device 110 may receive a service request for a video call from the seventh electronic device 170 which is an external device. In cases where the first electronic device 110 have no function or application capable of supporting video (e.g., a camera function or a video filming application), the first electronic device 110 may, for example, preferentially (e.g., first) provide only a voice call instead of the video call to a user. According to an embodiment, the first electronic device 110 may identify at least one function (e.g., a camera function) relating to the video call among one or more functions available in the second to sixth electronic devices 120, 130, 140, 150 and 160 incorporated in the communication system 101.

For example, the fifth electronic device 150, a home appliance, may not include a camera function, and the third electronic device 130, a notebook computer, may include a camera function. In this case, the first electronic device 110 may select the third electronic device 130 as an electronic device for providing video (e.g., a video call) corresponding to the voice call to the user, by identifying the camera function of the third electronic device 130. According to an embodiment, the first electronic device 110 may provide a video call instead of a voice call to a user through the third electronic device 130 on the basis of the camera function of the third electronic device 130.

According to an embodiment, based on a service request for a video call requested from the seventh electronic device 170, the first electronic device 110 may successively provide a voice corresponding to a voice function, which is one function of the video call, to a user through the first electronic device 110 and may provide video corresponding to a video function, which is another function of the video call, to the user through the third electronic device 130.

According to an embodiment, the first electronic device 110 may acquire one or more functions included in the second to sixth electronic devices 120, 130, 140, 150 and 160 located in the communication system 101 through the sixth electronic device 160 which provides interfaces between the first to sixth electronic devices 110, 120, 130, 140, 150 and 160. To achieve this, the first electronic device 110 may, for example, provide, to the sixth electronic device 160, information that a service request for a video call has been received from the seventh electronic device 170. According to an embodiment, when the service request for the video call is received from the seventh electronic device 170, the first electronic device 110 may notify the sixth electronic device 160 of information on the service request through the first communication link 122.

For example, on the basis of the reception of the information on the service request, the sixth electronic device 160 may identify at least one of the second to fifth electronic devices 120, 130, 140 and 150 incorporated in the communication system 101 and select an electronic device appropriate for a video call service (e.g., the third electronic device 130 including a camera function). For instance, the sixth electronic device 160 may control at least one of the first to fifth electronic devices 110, 120, 130, 140 and 150 incorporated in the communication system 101 such that the service for which the first electronic device 110 receives a request from the seventh electronic device 170 is provided through the first electronic device 110 and another appropriate device.

According to an embodiment, the first electronic device 110 may be connected to the second electronic device 120 through the second communication link 124 (e.g., Bluetooth). For example, the first electronic device 110, when receiving a service request from the seventh electronic device 170, may notify the second electronic device 120 of the service request. The notification operation may be performed, for example, at least based on the locations of the first and second electronic devices 110 and 120 or the location of a user.

For example, the first electronic device 110 may provide the notification of a video call service received from the seventh electronic device 170 to the first electronic device 110 or an electronic device within a specified distance from the user. For instance, among the first to sixth electronic devices 110, 120, 130, 140, 150 and 160, the second electronic device 120, which is a wearable electronic device, may be located closest to the user (e.g., may be worn on the user's body). Or, the second electronic device 120 may be, for example, an electronic device within a specified distance which performs D2D communication or short-range communication with the first electronic device 110. Accordingly, the first electronic device 110 may provide the notification to the second electronic device 120.

According to an embodiment, the second electronic device 120 having received the notification may respond to the service (e.g., video call service) requested from the seventh electronic device 170 on the basis of a user input. For example, the second electronic device 120 may provide a video call service to the user in response to the video call request of the seventh electronic device 170. According to the present embodiment, the video call service request transmitted from the seventh electronic device 170 may be changed into a voice call service through the second electronic device 120.

According to some embodiments, the second electronic device 120 having received the notification from the first electronic device 110 may identify another electronic device (e.g., the fourth electronic device 140) adjacent to the user (e.g., located in a room where the user is present). In addition, the second electronic device 120 may, for example, interwork with the another electronic device to provide a video call service. For example, the voice of the video call service may be provided through the second electronic device 120, and the images of the video call service may be provided through the fourth electronic device 140.

According to an embodiment, an operation of providing a specific service by a plurality of electronic devices interworking with each other may also be performed through the control of any one electronic device (e.g., the sixth electronic device 160). For instance, the sixth electronic device 160 may receive a notification from the first electronic device 110 and provide the notification to the second electronic device 120. In addition, the sixth electronic device 160 may provide, to the second electronic device 120, at least some of the video call information received from the first electronic device 110 (e.g., voice information or video information received from the seventh electronic device 170) such that the second electronic device 120 may provide a video call to the user.

According to an embodiment, a plurality of electronic devices may provide a service to a user, interworking with each other through the control of the first electronic device 110 having received the service request first from the seventh electronic device 170 external to the communication system 101. For example, the first electronic device 110 may provide at least some of the voice information or video information received from the seventh electronic device 170 to the second electronic device 120 communicating with the first electronic device 110. Furthermore, the first electronic device 110 may provide corresponding information to the second or fourth electronic device 120 or 140 in order to provide a voice through the second electronic device 120 and video through the fourth electronic device 140. In this case, the first electronic device 110 may provide, to the second and fourth electronic devices 120 and 140, information corresponding to the respective electronic devices through the sixth electronic device 160, or may directly provide the information corresponding to the electronic devices without the sixth electronic device 160.

According to an embodiment, the first to sixth electronic devices 110, 120, 130, 140, 150 and 160 incorporated in the communication system 101 may move in the communication system 101 while performing services. For example, when a user receiving a service through the second electronic device 120 is determined to move to the vicinity of the fifth electronic device 150 while wearing the second electronic device 120, the second electronic device 120 may create another service by combining functions included in the second and fifth electronic devices 120 and 150. According to some embodiments, the operations of determining the movement of the electronic devices and combining the functions thereof in the communication system 101 may also be performed through the control of the sixth electronic device 160.

According to an embodiment, the change of a service in the communication system 101 may be performed on the basis of the state information of at least one of the electronic devices 110, 120, 130, 140, 150 and 160. The state information may include, for example, at least one of the user, authority, location, priority, performance, available power, available storage space, communication speed, travelling speed, locking state, reserved task, and executed application of the electronic device. The state information may also be expressed, for example, as the available capability of the electronic device that may provide a function for the change of a service. According to an embodiment, the sixth electronic device 160 may manage the capabilities of the electronic devices 110, 120, 130, 140, 150 and 160, incorporated in the communication system 101, as resources for providing services, and may control services provided by the communication system 101 on the basis of the capabilities.

According to an embodiment, if at least one other electronic device 120, 130, 140, 150 or 160 is identified while the first electronic device 110 performs a service, the first electronic device 110 may determine the change of the service on the basis of the available power of the another electronic device (e.g., the residual quantity of a battery or whether the battery is charged or not). For example, the first electronic device 110 may identify the third electronic device 130 located within a specified distance while performing a text message service. The third electronic device 130 may be, for example, a laptop computer. The laptop computer may include, for example, a camera and a keyboard device. According to this embodiment, for example, only when the available power (e.g., battery residual quantity) of the third electronic device 130 is greater than or equal to a specified reference (e.g., about 30%), the first electronic device 110 may change the text message service into a video message service that utilizes the camera and the keyboard device of the third electronic device 130.

Figure 2:
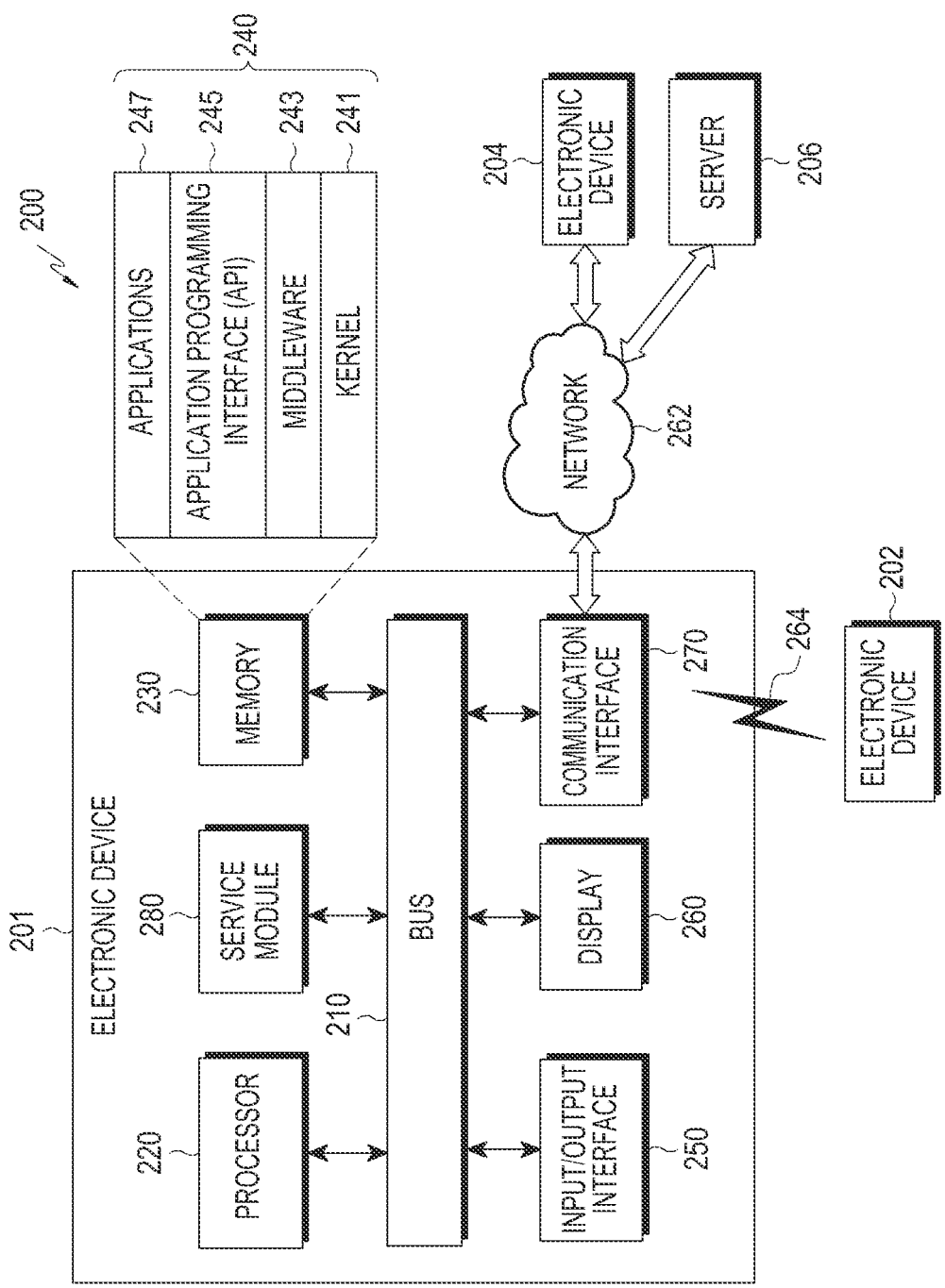
FIG. 2 is a block diagram of an electronic device according to various embodiments of the present disclosure.

FIG. 2 illustrates an electronic device in a network environment, according to various embodiments of the present disclosure. The electronic device according to this embodiment may be, for example, at least one of the first to seventh electronic devices 110, 120, 130, 140, 150, 160 and 170 illustrated in FIG. 1.

Referring to FIG. 2, and electronic device 201, in a network environment 200, may include a bus 210, a processor 220, a memory 230, an input/output interface 250, a display 260, a communication interface 270, and a service module 280. In some embodiments, the electronic device 201 may omit at least one of the elements, or may further include other elements.

The bus 210 may include, for example, a circuit for connecting the elements 210, 220, 230, 240, 250, 260, 270 and 280 and transmitting communication (e.g., control messages and/or data) between the elements.

The processor 220 may include one or more of a CPU, an AP, and a Communication Processor (CP). The processor 220 may, for example, carry out operations or data processing related to the control and/or communication of at least one other element of the electronic device 201.

The memory 230 may include a volatile memory and/or a non-volatile memory. The memory 230 may store, for example, instructions or data relating to at least one other element of the electronic device 201. According to an embodiment, the memory 230 may store software and/or a program 240. The program 240 may include, for example, a kernel 241, middleware 243, an Application Programming Interface (API) 245, and/or application programs (or "applications") 247. At least some of the kernel 241, the middleware 243, and the API 245 may be referred to as an Operating System (OS).

The kernel 241 may, for example, control and/or manage system resources (e.g., the bus 210, the processor 220, or the memory 230) used to execute operations or functions implemented in the other programs (e.g., the middleware 243, the API 245, or the application programs 247). Furthermore, the kernel 241 may provide an interface through which the middleware 243, the API 245, or the application programs 247 may access the individual elements of the electronic device 201 to control or manage system resources.

The middleware 243 may function, for example, as an intermediary that makes the API 245 or the application programs 247 communicate with the kernel 241 to exchange data.

Furthermore, the middleware 243 may process one or more task requests received from the application programs 247 according to priorities thereof. For example, the middleware 243 may assign a priority for using the system resources (e.g., the bus 210, the processor 220, the memory 230, and the like) of the electronic device 201 to at least one of the application programs 247. For example, the middleware 243 may perform scheduling or loading balancing on the one or more task requests by processing the one or more task requests according to the priority assigned to the at least one application program.

The API 245 is, for example, an interface by which the applications 247 control functions provided from the kernel 241 or the middleware 243, and may include, for example, at least one interface or function (e.g., instruction) for file control, window control, image processing, or text control.

The input/output interface 250 may function, for example, as an interface that may transmit instructions or data input from a user or another external device to the other element(s) of the electronic device 201. In addition, the input/output interface 250 may output instructions or data received from the other element(s) of the electronic device 201 to the user or the another external device.

The display 260 may include, for example, a liquid crystal display (LCD), a light emitting diode (LED) display, an organic light emitting diode (OLED) display, a micro electro mechanical system (MEMS) display, or an electronic paper display. The display 260 may display, for example, various types of contents (e.g., text, images, videos, icons, or symbols) to the user. The display 260 may include a touch screen, and may receive, for example, a touch, gesture, proximity, or hovering input using an electronic pen or the user's body part.

The communication interface 270 may, for example, set up communication between the electronic device 201 and an external device (e.g., a first external electronic device 202, a second external electronic device 204, or a server 206). According to an embodiment, the electronic device 201 may be connected to the external device (e.g., the first or second electronic device 202 or 204, or the server 206) using wired or wireless communication through a first network 262 and a second network 264. The first network 262, according to this embodiment, may include a network that may provide the third communication link 126 illustrated in FIG. 1. The second network 264, according to this embodiment, may include a network that may provide the first or second communication link 122 or 124 illustrated in FIG. 1. Although the first and second networks 262 and 264 are separated from each other in this embodiment for convenience of description, various embodiments are not limited thereto, and various modifications may be made.

According to various embodiments, the electronic device 101 may be, for example, the first electronic device 110 pertaining to the communication system 101 illustrated in FIG. 1, and the first external electronic device 202 may be, for example, at least one of the second to sixth electronic devices 120, 130, 140, 150 and 160 pertaining to the communication system 101. The second external electronic device 204 according to this embodiment may be, for example, the seventh electronic device 170 illustrated in FIG. 1. Additionally or alternatively, the server 206 operated by a communication business operator or service provider, which is different from the third electronic device 130 (e.g., cloud device) located in the local network (e.g., the communication system 110) illustrated in FIG. 1, may be included. Here, the distinction between the first to seventh electronic devices and the electronic devices 201, 202, 204 is described as one example for convenience of description. The types, functions, roles, and number of electronic devices are not limited thereto, and various embodiments may be made.

The wireless communication may use, for example, at least one of long term evolution (LTE), LTE-advance (LTE-A), code division multiple access (CDMA), wideband CDMA (WCDMA), universal mobile telecommunications system (UMTS), Wireless Broadband (WiBro), and global system for mobile communications (GSM), for example, as a cellular communication protocol. In addition, the wireless communication may include, for example, short-range communication. The short-range communication may include, for example, at least one of wireless fidelity (Wi-Fi), Bluetooth, near field communication (NFC), and GPS. The wired communication may include, for example, at least one of a universal serial bus (USB), a high definition multimedia interface (HDMI), recommended standard 232 (RS-232), and a plain old telephone service (POTS). The network (e.g., the first or second network 262 or 264) may include at least one of a communication network such as a computer network (e.g., a LAN or a WAN), the Internet, and a telephone network.

The service module 280 may, for example, process at least some of the digital information acquired from the other elements (e.g., the processor 220, the memory 230, the program 240, the input/output interface 250, the display 260, and the communication interface 270) and provide the processed information to a user in various manners. The service module 280 may, for example, control at least some functions of the electronic device 201 using the processor 220 or independently of the processor 220 such that the electronic device 201 interworks with another electronic device.

According to an embodiment, the service module 280, when receiving a service request from the second external electronic device 204, may provide a service corresponding to the service request to a user, interworking with the first external electronic device 202. For example, the service module 280 may identify the first external electronic device 202 which provides a function corresponding to a service request. Furthermore, the service module 280 may provide, to the user, some functions of the service corresponding to the service request through the electronic device 201, and other functions of the service through the first external electronic device 202. Additional information on the service module 280 will be provided below through FIGS. 3 to 11.

At least one of the first and second external electronic devices 202 and 204 may be the same or a different type of device from the electronic device 201. According to an embodiment, the server 206 may include a group of one or more servers. According to various embodiments, all or some of the operations executed in the electronic device 201 may be executed in another or a plurality of electronic devices (e.g., the external electronic devices 202, 204 or the server 206). According to an embodiment, when the electronic device 201 has to perform some functions or services automatically or in response to a request, the electronic device 201 may make a request for performing at least some functions related to the functions or services to another device (e.g., the external electronic device 202 or 204, or the server 206) instead of performing the functions or services by itself or additionally. The another electronic device (e.g., the external electronic device 202 or 204, or the server 206) may carry out the requested functions or the additional functions and provide the results thereof to the electronic device 201. The electronic device 201 may provide the requested functions or services by processing the received results as they are or additionally. To this end, for example, cloud computing, distributed computing, or client-server computing technology may be used.

Figure 3:
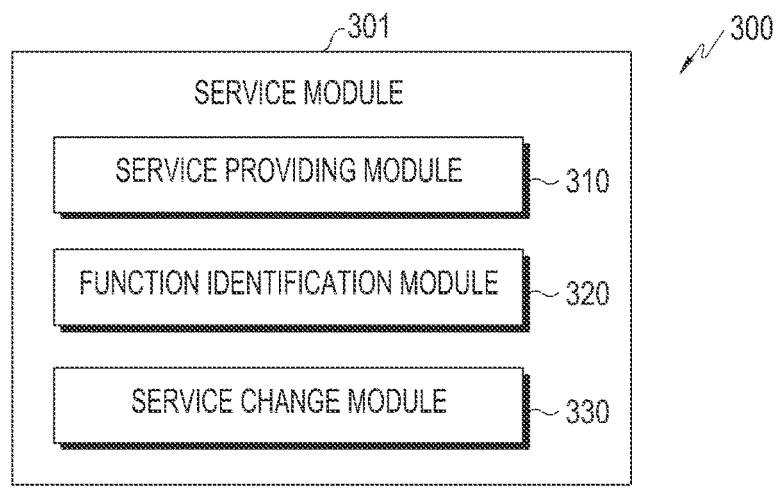
FIG. 3 is a block diagram of a service module of an electronic device, according to various embodiments of the present disclosure.

FIG. 3 is a block diagram of a service module of an electronic device, according to various embodiments of the present disclosure. The electronic device according to this embodiment may be, for example, the electronic device 201 illustrated in FIG. 2. The service module according to this embodiment may be, for example, the service module 280 illustrated in FIG. 2.

Referring to FIG. 3, a service module 301, of an electronic device 300, may include a service providing module 310, a function identification module 320, and a service change module 330.

The service providing module 310 may provide a service, for example, in response to a service request of an external device (e.g., the first or second electronic device 202 or 204) or a user. For example, the service providing module 310 may provide, to the user, at least some functions of the service corresponding to the service request as a part of the service (hereinafter, for convenience of description, referred to as a "partial service") on the basis of the functions (or applications) included in the electronic device 300 or the state information of the electronic device 300 (e.g., a residual quantity of a battery, an amount of used memory, or a locking state). According to some embodiments, the service providing module 310 may also provide a service the same (or almost the same) as the service corresponding to the service request, or may provide the service corresponding to the service request and a service including additional functions (hereinafter, for convenience of description, referred to as an "extended service").

For example, in cases where a photograph is transmitted from the external device to the electronic device 300, the service providing module 310 may identify the reception of the photograph as the service request. In addition, the service providing module 310 may, for example, provide a photo viewing function as the service to the user such that the user may view the photograph. According to an embodiment, in cases where the electronic device 300 does not provide the photo viewing function, the service providing module 310 may provide text or a voice, notifying that the photograph has been received, as the partial service to the user instead of the photo viewing service in response to the reception of the photograph.

According to an embodiment, the service providing module 310 may receive an execution request for a word document as the service request from the user. The service providing module 310 may provide a word document service in response to the execution request for the word document. Meanwhile, in cases where a word application is not installed in the service providing module 310, the service providing module 310 may provide, for example, another application (e.g., a memo application), which may substitute for the word document, as the partial service to the user.

According to an embodiment, the service providing module 310 may receive a video call from the external device. In cases where the user selects the acceptance of the video call, the service providing module 310 may provide a video call service to the user by executing a video call application in response to the service request for the video call. In cases where a camera function is not included in the electronic device 300, or depending on the state of the electronic device 300 (e.g., a battery capacity being about 10% or less), a camera function may be temporarily unsupported. In this case, the service providing module 310 may preferentially provide a voice call service, which may support only a voice instead of the video call, to the user in response to the service request for the video call.

According to an embodiment, the service providing module 310 may provide (e.g., display) guide information for the selection of service execution through an output device (e.g., the display 260) operatively connected to the electronic device 300. For example, in cases where a video call is received, the service providing module 310 may provide a selection menu, as the guide information, for the acceptance or refusal of the video call. For instance, the service providing module 310 may provide the selection menu with a voice, or may provide the selection menu with visual information, such as an icon, text, an image, and the like, through a display.

The service providing module 310 may, for example, represent (e.g., display) content related to a requested service through the output device (e.g., the display 260). According to an embodiment, in cases where the requested service is a video call service, the service providing module 310 may display, on a screen, images received from the external device having requested the video call and/or images stored in the electronic device 300. According to an embodiment, the service providing module 310 may control an external device (e.g., the first external electronic device 202) (hereinafter, for convenience of description, referred to as a "first external device") pertaining to a communication system (e.g., the communication system 101) to perform at least a part of the service. For example, the service providing module 310, when trying to provide a video call to the user, may control the first external device to acquire (e.g., capture) the user' images.

According to an embodiment, the service providing module 310 may receive, from the first external device, information (e.g., the user's images) acquired using the function of the first external device. The service providing module 310 may, for example, bind the function of the first external device with an application executed through the electronic device 300. For example, the application may control the function of the first external device at runtime. In an example, the application may work in conjunction with the function of the first external device through a gateway device (e.g., the sixth electronic device 160). For instance, the service providing module 310 may provide a video call to the user by combining (e.g., merging or synchronizing) the user's received images with his/her voice.

The service providing module 310 may, for example, identify one or more pieces of contextual information related to a service provided by the electronic device 300 and provide an additional service using the one or more pieces of contextual information. The contextual information may refer to information on an activity or task occurring in relation to the user or a device. For example, the contextual information may include a user context, a physical environment context, a computing system context, and a user-computer interaction context. The user context may include, for example, an identification context (e.g., identity, name, and the like) and a body context (e.g., pulse, blood pressure, body temperature, voice, and the like). The physical environment context may include, for example, a spatial context (e.g., location, direction, speed, and the like), a time context (e.g., date, time, season, and the like), an environmental context (e.g., temperature, humidity, intensity of illumination, noise, and the like), an activity context (e.g., a person nearby a user, action, schedule, and the like). The computing system context may include, for example, device resources (e.g., battery, display, Internet, system, and the like), an available context (e.g., resource, equipment, facility, and the like), and an access context (e.g., user, allowable information, adjacency, and the like). The user-computer interaction context may include, for example, a history context (e.g., user, service, time, and the like), a failure context (e.g., time, user, service-related failure, and the like), and the like.

According to an embodiment, in cases where the electronic device 300 performs a telephone call or message service, the service providing module 310 may identify information on a user of an external device (e.g., the second external device 204) (hereinafter, for convenience of description, referred to as a "second external device") outside of a communication system (e.g., the communication system 101), which is connected for the service. For example, in cases where there is activity (e.g., bike-riding) information in which the user of the electronic device 300 and the user of the second external device are involved in together, the service providing module 310 may provide the activity related information (e.g., a work rate, a travel distance, a travel path, a speed, ranking, images, and the like) through the output device (e.g., display) of the first external device.

According to an embodiment, in cases where the electronic device 300 performs an Internet lecture service, the service providing module 310 may identify the user's concentration on the service by sensing the user's motion or brainwaves through the electronic device 300 or the first external device. The user's motion may be detected, for example, through a motion sensor (e.g., a gyro sensor 1040B, or an acceleration sensor 1040E illustrated in FIG. 10, and the like) or a camera (e.g., a camera module 1091 illustrated in FIG. 10 or the fourth electronic device 140), which is operatively connected to the electronic device 300 or the first external device. The brainwaves may be detected through a wearable device including an electroencephalography (EEG) for sensing/interpreting brainwaves or a brain chip for sensing/interpreting signals of nerve cells. Additionally or alternatively, porting or non-porting interface technology may be used. To this end, for example, brain-computer interface (BCI), computer-brain interface (CBI), or brain-brain interface (BBI) technology may be used as an interface technology using brainwaves. For instance, the drowsiness of the user may be detected by the theta (θ) wave (e.g., about 4.0 to 7.99 Hz), and the sleeping of the user may be detected by the delta (δ) wave (e.g., about 0.2 to 3.99 Hz).

For example, in cases where the user is analyzed to be in a lower concentration state than that necessary for efficient learning, the service providing module 310 may provide a music service through the electronic device 300 or the first external device. Furthermore, for instance, the service providing module 310 may provide (e.g., display), to the user, suggestions about services (e.g., exercise, rest, snack, another lecture, and the like) specified as being helpful for efficient learning. When the user selects at least one of the suggested services, the service providing module 310 may provide the selected service through at least one of the electronic device 300 and the first external device.

The service providing module 310 may, for example, make a control to transmit the information acquired using the function of the first external device to the second external electronic device connected to the electronic device 300. For example, the service providing module 310 may transmit the user's images acquired from the first external device and the user's voice acquired through the electronic device 300 to the second external device making a call with the electronic device 300.

According to an embodiment, in cases where the electronic device located in a living room performs a video call service while being connected to the second external device outside the communication system, the service providing module 310 may, for example, provide a user interface (e.g., graphical user interface (GUI)) capable of controlling a lamp in the living room to the second external device. In this case, when the electronic device 300 is moved from the living room to a main room, the service providing module 310 may, for example, provide a user interface capable of controlling a TV in the main room to the second external device. The user interface provided from the electronic device 300 to the second external device may be displayed, for example, in an icon form on the screen of the second external device in an embodiment for a video call.

According to an embodiment, in cases where the electronic device 300 at home performs a telephone call or message service while being connected to the second external device, the service providing module 310 may, for example, provide information on another user wearing the first external device located in the communication system (e.g., the communication system 101) to the second external device. For example, the electronic device 300 of a first user, while being connected to the second external device of a second user, may provide biometric information (e.g., hear rate, body temperature, brainwaves, blood glucose, work rate, and the like) of at least one third user located in the communication system to the second external device. The operation of providing, to the second external device, information acquired by the first external device or an interface for a device in the communication system (e.g., the first to sixth electronic devices 110, 120, 130, 140, 150 and 160 incorporated in the communication system 101) may further include, for example, an operation of authenticating the user of the second external device.

The function identification module 320 may, for example, identify one or more functions included in the electronic device 300 or one or more external devices (e.g., first external devices). According to an embodiment, the function identification module 320 may identify at least one function relating to a service (e.g., partial service) provided by the electronic device 300, among the one or more functions. For example, despite the reception of a service request for a video call, the service providing module 310 may provide a voice call, as the partial service, for which images are not provided. In this case, the function identification module 320 may identify at least one function (e.g., a camera function), which may provide the video call, in the one or more external devices (e.g., first electronic devices) in regard to the voice call.

The one or more external devices may include, for example, electronic devices that may be used as one communication system (e.g., the communication system 101) through a specified protocol. For example, the one or more external devices may include electronic devices that may provide services to a user while interworking with each other in a specified space (e.g., a home, an office, a café, a hospital, and the like) related to a user. Hereinafter, among the one or more external devices, an electronic device identified as a device that may provide a function for a service running in the electronic device 300 may be referred to as a "function providing device." However, this is for convenience of description and, for example, one or more of the first to sixth electronic devices 110, 120, 130, 140, 150 and 160 illustrated in FIG. 1 may provide functions included therein to another device or receive functions included in another device.

According to an embodiment, the function identification module 320 may identify a function which is not included in the electronic device 300, as at least one function relating to a service (e.g., partial service) provided by the electronic device 300. For example, in cases where a camera function is not included in the electronic device 300, the function identification module 320 may select a camera function included in an external device as the at least one function.

According to an embodiment, the function identification module 320 may determine the at least one function on the basis of the location of the electronic device 300 relative to the first external device. For example, when it is determined that the location of the electronic device 300 relative to the first external device corresponds to a specific location or specified location, the function identification module 320 may determine a function included in the first external device as the function relating to the service (e.g., partial service) which is being provided by the electronic device 300.

According to an embodiment, the first external device may include a first function providing device and a second function providing device. For example, a user corresponding to the electronic device 300 (e.g., a user holding or wearing the electronic device 300) may be a first distance (e.g., about 1 m) from the first function providing device and a second distance (e.g., about 7 m) from the second function providing device. In this case, the electronic device 300 may determine a function included in the first function providing device located closer to the user as at least one function associated with a service (e.g., partial service) which is being provided by the electronic device 300. According to an embodiment, in cases where the user moves closer to the second function providing device than the first function providing device, the electronic device 300 may determine a function included in the second function providing device as at least one function relating to the service (e.g., partial service) which is being provided by the electronic device 300.

According to an embodiment, the function identification module 320 may specify a function included in the first external device as a candidate function that may be used to change the service being provided by the electronic device 300 into another service (hereinafter, for convenience of description, referred to as a "changed service"). In cases where a function that does not exist in the electronic device 300 is identified in the first external device, the function identification module 320 may identify an application capable of using the function. For example, the electronic device 300 may identify another application (e.g., a second application) capable of using the function in the first external device, where the another application is different from an application (e.g., a first application) running in the electronic device 300, and may provide the changed service using at least the another application.

According to an embodiment, a security application to be executed in the electronic device 300 may be an application that may process a user's face information as authentication information, but cannot process the user's fingerprint information as authentication information. According to an embodiment, in cases where an authentication service requiring fingerprint information is requested, the electronic device 300 may provide the authentication service, for example, using an application that may process the fingerprint information, where the application is executable in a function providing device. Furthermore, in this case, the electronic device 300 may provide the authentication service by additionally using a fingerprint recognition sensor included in the function providing device.

According to an embodiment, the function identification module 320 may determine a function of an external device as a function to be used for a service change, according to identification information of the external device (e.g., the first external device). The identification information may include, for example, a device type, manufacturing information (e.g., a manufacturer), a telephone number, a device address (e.g., an MAC address), a device ID, mobility, location information, a device owner, a device manager, and the like.

According to an embodiment, the function identification module 320 may detect a specified function among the functions included in an external device (e.g., the first external device). For example, in cases where the electronic device 300 receives a request for a security service requiring a biometric information recognition sensor (e.g., a fingerprint recognition sensor, a iris recognition sensor, a voice recognition sensor, a face recognition sensor, and the like), the function identification module 320 may identify whether there is a device capable of providing a biometric information recognition sensor among peripheral devices or servers. For example, the electronic device 300 having no fingerprint recognition sensor may provide a pattern lock function in response to a request for a fingerprint lock function. According to this embodiment, when it is determined that an external device capable of providing a fingerprint recognition sensor is located a predetermined distance or less therefrom, the electronic device 300 may change the pattern lock function into a fingerprint lock function. In some embodiments, a fingerprint lock function may be provided in addition to a pattern lock function. In some embodiments, the function identification module 320 may perform registration and authentication between devices.

The function identification module 320 may store the identified function, for example, in the form of a database in a memory (e.g., the memory 230) operatively connected to the electronic device 300. According to an embodiment, the function identification module 320 may represent (e.g., display) the identified function through an output device (e.g., the display 260) operatively connected to the electronic device 300. In some embodiments, the function identification module 320 may also acquire information on a function included in an external device (e.g., the first external device), for example, from a server (e.g., the sixth electronic device 160).

The service change module 330 may, for example, change a service (e.g., partial service) running in the electronic device 300 into another service (e.g., changed service) relating to a service request, using at least one function available in an external device (e.g., the first external device). For example, in cases where a voice call is provided as the partial service through the electronic device 300 in response to a service request for a video call, the service change module 330 may provide a video call as the changed service to a user using a camera function acquired from a function providing device. The service providing module 310 may, for example, represent (e.g., display) notification information relating to the service change through an output device (e.g., the display 260). According to an embodiment, the service change module 330 may represent (e.g., display) information on the service change to a user through the service providing module 310.

According to an embodiment, when it is determined that the location of the electronic device 300 relative to the function providing device corresponds to a specified location, the service change module 330 may provide a service corresponding to a service request using the electronic device 300 and the function providing device together. For example, in cases where a voice and video are received from a counterpart electronic device (e.g., the second external device) having requested a video call, the service change module 330 may provide the counterpart's voice through the electronic device 300 and the counterpart's video through the function providing device. In addition, the service change module 330 may acquire a voice of a user of the electronic device 300 through the electronic device 300, and may acquire the user's video through the function providing device to transmit the video to the counterpart.

The movement of an electronic device or relative locations between electronic devices in a communication system (e.g., the communication system 101) may be identified, for example, through location determination technology using a GPS or Wi-Fi. According to an embodiment, the location of an electronic device may be identified through multi-input multi-output (MIMO) technology using multiple antennas. For instance, through the MIMO technology, the electronic device may determine the location thereof using at least one value of a round trip time (RTT), a radio signal strength indicator (RSSI), modulation and coding scheme (MCS) information, Time of Flight (ToF), an Angle of Arrival (AoA), and an Angle of Departure (AoD) of signals transmitted/received between the electronic device and an access point (AP). In addition, for example, the distances and angles between electronic devices may be identified using messages such as a probe request, a probe response, and the like. Furthermore, for example, it is also possible to estimate the location of user equipment that transmits signals, using the phase difference between the signals detected by two or more antennas included in an AP.

According to some embodiments, in cases where the distance between the electronic device and the function providing device is within a specified range for a specified time (e.g., about 10 seconds), the service change module 330 may change the service (e.g., partial service) into the changed service. In addition, for example, when it is determined that the electronic device 300 or the function providing device is likely to move to a different location within a specified time (e.g., about 1 minute), the service change module 330 may determine not to change the service. Also, for instance, when it is determined that the electronic device or the function providing device has moved or is likely to move to a different location while the changed service is being performed, the service change module 330 may change the changed service into the partial service again.

According to an embodiment, the service change module 330 may identify the state information of the electronic device 300 or an external device (e.g., the function providing device). For example, the service change module 330 may determine the changed service further on the basis of the state information of at least one of the electronic device 300 and the external device. The state information may include, for example, at least one of a user, authority, a priority, performance, available power, an available storage space, a communication speed, a travelling speed, a locking state, and an executed application. According to an embodiment, in cases where a plurality of electronic devices request a function of the function providing device, the service change module 330 may execute a service change with reference to a pre-registered priority for the use of the function providing device. For example, the service change module 330 may change a service only when the priority of the electronic device 300 is higher than that of one of the plurality of electronic devices. According to some embodiments, the service change module 330 may discover another function providing device when the priority of the electronic device 300 is lower than that of one of the plurality of electronic devices.

According to an embodiment, the service change module 330 may determine the change of a service according to the presence or absence of functions of electronic devices incorporated in a communication system (e.g., the communication system 101). For example, the service providing module 310 may perform a first service (e.g., a video call service) using at least one of a first camera included in the electronic device 300 and a second camera included in the function providing device. When a request for using the second camera included in the function providing device is received from another external device (a third external device) incorporated in the communication system during the performance of the first service, the service change module 330 may change the first service into, for example, another service (e.g., a voice call service) that does not use the second camera.

The service change module 330 may determine a service to change, for example, on the basis of the type of electronic device 300. For example, the electronic device 300 may be a smart watch, and the function providing device may be a tablet computer. According to an embodiment, in cases where the smart watch providing a voice call service enters an area where the tablet computer may be used, the voice call service may be changed into a video call service using a camera of the tablet computer. According to some embodiments, in a case where the electronic device 300 is a smart phone, if the smart phone providing a video call service enters an area where the tablet computer may be used, the video call service may be changed into a complex video call service to which a white board function or a hand-written letter function, which uses the touch panel of the tablet computer, is added. In addition, for example, one part of a screen (user image) for the video call service may be displayed on the smart phone, and another part of the screen may be displayed on the tablet computer. Additionally or alternatively, the service change module 330 may determine the type of a service to change on the basis of the type of application executed in the electronic device 300 or the user of the electronic device 300.

According to an embodiment, the service change module 330, when acquiring a specified (e.g., pre-defined) information while providing a service, may change the running service into another service. According to this embodiment, the service providing module 310 may, for example, provide a multimedia service that uses an audio output device (e.g., a speaker 1082 illustrated in FIG. 10) operatively connected to the electronic device 300. When an external acoustic sound of a predetermined magnitude or more is recognized while the multimedia service is being provided, the service change module 330 may provide a service that uses another electronic device capable of providing a higher audio output.

According to an embodiment, the service change module 330 may determine the change of a service and/or the type of changed service on the basis of content acquired in relation to the service (e.g., partial service) provided by the electronic device 300. According to some embodiments, when images unsuitable for the specification (e.g., resolution) of a display (e.g., the display 260) included in the electronic device 300 are received in the electronic device 300, the service change module 330 may display the images through a display external to the electronic device 300. According to some embodiments, when an image relating to a specified object (e.g., person) is received in the electronic device 300, the service change module 330 may display the image through the external display.

According to an embodiment, the operation of the service change module 330 may include creating an additional service (or secondary service), in addition to changing a running service. For example, the service change module 330 may create an auxiliary service for the running service and transmit a request to another electronic device in order to make the another electronic device perform at least a part of the auxiliary service.

According to an embodiment, the service change module 330 may determine the change of a service provided through the electronic device 300 on the basis of the available power of the electronic device 300. For example, the electronic device 300 may perform a first service utilizing a motion sensor (e.g., acceleration sensor) and a camera which are included in the electronic device 300. According to this embodiment, when it is determined that the available power of the electronic device 300 is a specified reference (e.g., about 30%) or less, the service change module 330 may change the first service into the second service that uses the motion sensor included in the electronic device 300 and the camera included in the function providing device. According to some embodiments, the service change module 330 may also determine the change of a service provided through the electronic device 300 based on whether the electronic device 300 is charged.

Figure 4:
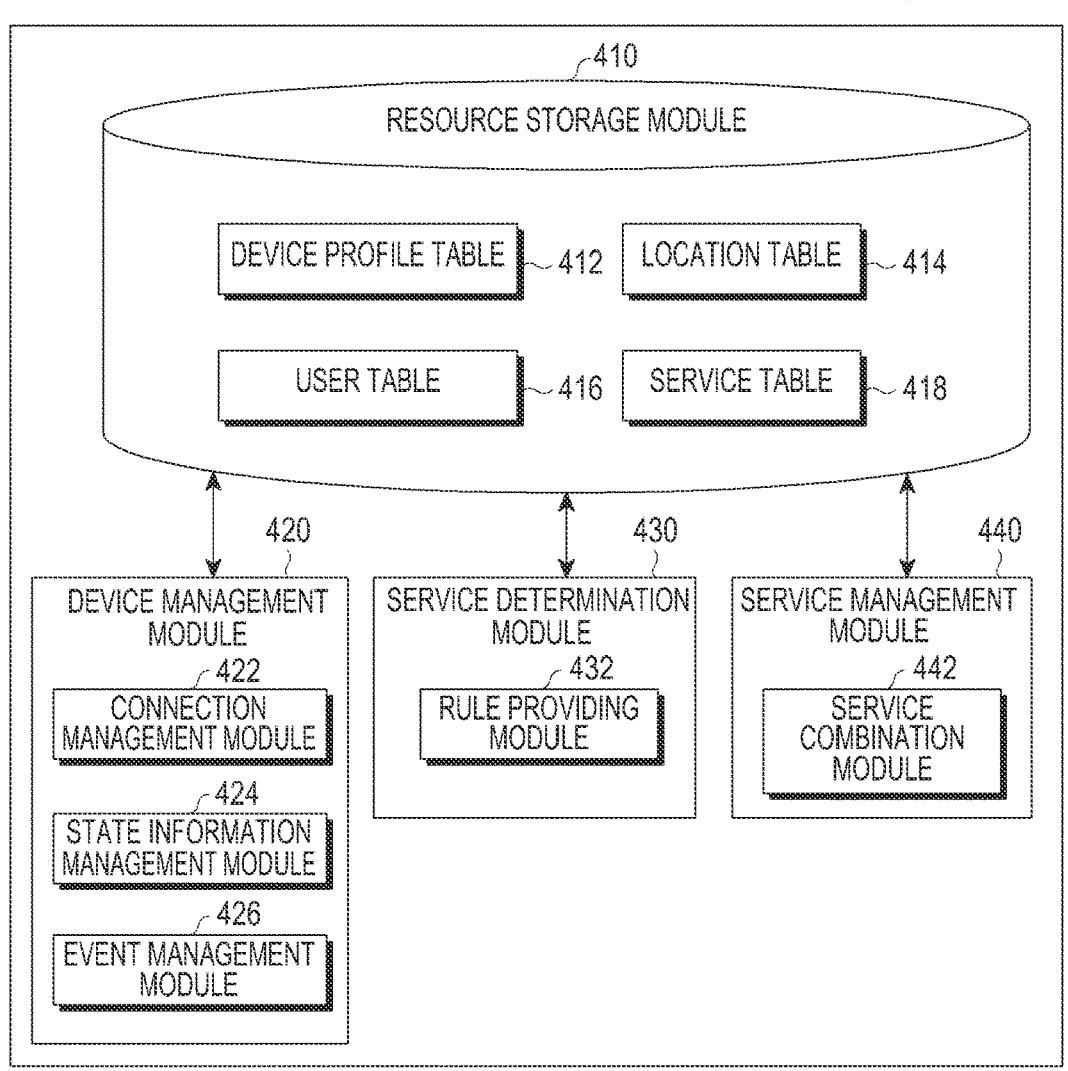
FIG. 4 is a block diagram of an electronic device according to various embodiments of the present disclosure.

FIG. 4 is a block diagram of an electronic device according to various embodiments of the present disclosure. According to an embodiment, the electronic device may include at least one of the first to sixth electronic devices 110, 120, 130, 140, 150 and 160 in the communication system 101 illustrated in FIG. 1. In some embodiments, the electronic device may also include the server 206 illustrated in FIG. 2.

Referring to FIG. 4, an electronic device 400 may include at least some modules of a service module (e.g., the service module 301). For example, the electronic device 400 may not include at least one of a service providing module (e.g., the service providing module 310), a function identification module (e.g., the function identification module 320), and a service change module (e.g., the service change module 330) according to the performance, function, or role thereof. Descriptions of the same or similar parts as in FIGS. 1 to 3 will be omitted. The electronic device 400 may include a resource storage module 410, a device management module 420, a service determination module 430, and a service management module 440.

The resource storage module 410 may include, for example, a device profile table 412, a location table 414, a user table 416, and a service table 418. In some embodiments, the tables may be stored in a memory (e.g., the memory 230) operatively connected to the resource storage module 410. According to an embodiment, the resource storage module 410 may include information acquired by using hardware/software functions and corresponding functions that may be provided by electronic devices (e.g., the electronic devices 110, 120, 130, 140, 150 and 160) incorporated in a communication system (e.g., the communication system 101). According to an embodiment, the resource storage module 410 may provide information to which the other elements (e.g., the device management module 420, the service determination module 430, and the service management module 440) of the electronic device 400 may refer in order to perform operations thereof. The resource storage module 410 may be implemented, for example, in the form of a database and stored in a memory (e.g., the memory 230) operatively connected to the electronic device 400. In addition, for example, the resource storage module 410 may include at least some of an internal memory containing a control module (e.g., control logic), an external memory, and a storage device (e.g., a hard disc drive).

The device profile table 412 may be, for example, a database that provides descriptions of the attributes of the electronic devices incorporated in the communication system (e.g., the communication system). The device profile table 412 may include fixed attributes (e.g., a device ID, a security value, and the like) or variable attributes (e.g., a current state, a location ID, a connection device, and the like). For example, a function that an electronic device (e.g., the fifth electronic device 150) incorporated in the communication system (e.g., the communication system 101) may provide for a service to be performed in an external device (e.g., the second electronic device 120) may be identified through information (e.g., a function list of Table 1) in the device profile table 412. For example, the electronic device 400 may identify the manufacturer information (e.g., model name of Table 1) of the electronic devices incorporated in the communication system (e.g., the communication system 101) and determine the function sharing between the electronic devices on the basis of at least the manufacturer information.

According to an embodiment, when the state information (e.g., security, a current state, power information, a connection device, available functions, or connectable devices of Table 1) of an electronic device (e.g., the fifth electronic device 150) incorporated in the communication system (e.g., the communication system 101) is modified, the electronic device (e.g., the fifth electronic device 150) may request the electronic device 400 to update the modified state information to the device profile table 412. For example, an external device (e.g., the second electronic device 120) or the electronic device 400 may change a service of the external device (e.g., the second electronic device 120) on the basis of the state information or the updated state information. In an example, when it is identified that the camera function of the electronic device (e.g., the fifth electronic device 150) is not currently in use, the external device (e.g., the second electronic device 120) may change a currently provided service into a service utilizing the camera function.

Table 1 below represents examples of information that may be included in the device profile table 412.

TABLE 1

| | Name | Description | attribution |
|---|---|---|---|
| 0 | ID | Device serial number (UID) | 12345678 |
| | Type | Device type information | Phone, Tablet, Wearable, PC, TV, Camera, Tag, etc. |
| | Model Name | Device manufacturing information | Samsung, Suwon, Galaxy S5, Gear Fit, etc. |
| | Device Address | Unique identification information included in device itself | Mac Address |
| | Date | Device registration date and time | 2014-08-03 17:03 |
| | Main Device | Whether to use intermediate management device for device registration (ex) YES in case of direct registration in communication system (e.g., cloud system), NO in case of using intermediate device, and Device ID of Phone in case of Phone | YES, NO, 1234567, etc. |
| | Phone Number | Phone number, Phone number of connected and used device in cases where device has no phone number, Address of corresponding device, etc. | +821012345678 |
| | Device List | List of devices registered therethrough in case of main device having sub-devices, and mark YES in case of main device itself | YES, 0000, 1234, etc. |
| | Storage | Storage capacity | 2 G |
| 0 | Mobility | Mobility (High, Intermediate, and Low: High (phone gear), Intermediate (robot cleaner, electric fan), and Low (refrigerator, TV)) | |
| 1 | Display | Presence or absence, Size or Resolution | 1024 × 768 |
| 2 | Function List(T) (or Resource List) | List of functions that device can provide - Multi-function available | Call (voice, video), Camera, Internet, Video play, E-mail, Fingerprint sensor, etc. |

TABLE 1-continued

Device Profile

| o | Name | Description | attribution |
|---|---|---|---|
| 3 | Interface | Type of supportable connectivity interface | Wi-Fi, BLE, BT, USB, HDMI, etc. |
| 4 | Location ID | Detailed location in units constituting cloud | Room1, block1, etc. |
| 5 | Owner | Main manager or Owner ID of corresponding device | User 1, Daniel, etc. |
| 6 | Security | Security level | High, Intermediate, Low |
| 7 | Curret state | Current active state or not, Idle or not | On, Off, Sleep, etc. |
| 8 | Power information | It means power cable, battery, etc. and residual quantity (or available time) in case of battery | Power cable, 90%, etc. |
| 9 | Connection device | Information on currently connected device | TV, Camera, etc. |
| 0 | Available function | Currently used function | Camera, Note, Voice call, etc. |
| 1 | Connectable device | Information on additionally connectable device in current location - changeable on occasion according to location movement | Camera, Tab S, etc. |
| 2 | ... | | |

The location table 414 may be, for example, information for managing services using the locations of the electronic devices in the communication system. According to an embodiment, the location table 414 may be referred to in order to provide a service using spatial distinction (e.g., a room type, a section number, and the like) within the communication system. Tables 2 and 3 below represent examples of information that may be included in the location table 414. For example, the electronic device 400 may make a control such that a function may be shared between electronic devices that have the same location information or are predicted to have the same location information (e.g., location of table 2) among the electronic devices incorporated in the communication system (e.g., the communication system 101).

TABLE 2

Location Table

| o | Name | Description | Example |
|---|---|---|---|
| | Location | Location (e.g., Region) information in cloud system | Main room, Living room, Room01, Shop01, etc. |
| | Location ID | Shared ID referring to specific location | R01 (Main room), T01 (Rest room 1), etc. |
| | Device ID List | Device ID list included in location (region) | TV01, Phone01, etc. |
| | Function List | Function list for each device list (joinable with device table) | Call, Camera, etc. |
| | Service List | Service list (joinable with service table) | Video call (Doing), Watching movie (Ready), etc. |
| | ... | | |

TABLE 3

| Location | Location ID | Device ID | Functions |
|---|---|---|---|
| Main room | R01 | TV01 | Video Play Game ... |
| | | Phone01 | Voice call Video call Camera |
| | | Tablet01 | Memo Video play ... |
| Study | R02 | TV02 Gear01 Camera03 | ... |
| Region 1 | ID of Region | Device ID 1 | Function 1 Function 2 ... |
| ... | | | |

The user table 416 may be, for example, a database for managing the electronic devices incorporated in the communication system according to users thereof. According to an embodiment, the user table 416 may be used to determine a priority in the combination of functions or the change of a service within the communication system. According to some embodiments, the user table 416 may include information on individual users and information on a user group. Table 4 below represents examples of information that may be included in the user table 416.

TABLE 4

User Table

| o | Name | Description | Example |
|---|---|---|---|
| | Name | User Name | Kim, Lee, etc. |
| | Type | Basic user group | Parents, Children, etc. |
| | Level | Basic user level | High, Middle, Low, etc. |
| | Device List | ID list of devices, the main user of which is user | Galaxy S5001, 012345678 (Device ID), etc. |
| | Location | Location of user | Main room, Living room, etc. |
| ... | Others | Various other elements capable of connecting people and devices in a house | |

The service table 418 may be, for example, a database used to specify a candidate service list of services to be changed on the basis of the location of the electronic device 400. According to an embodiment, the service table 418 may provide location information or device information for a service change to the other elements (e.g., the device management module 420) with reference to the device profile table 412 and the location table 414. Table 5 below represents examples of information that may be included in the service table 418.

TABLE 5

Service Table

| Name | Description | Example |
|---|---|---|
| Service Name | Available service in cloud | Video call, Listening to music, CCTV, Notification, etc. |
| Function List | Function list necessary for service | Video call - Voice input, Video output, Video input, Whiteboard, etc. |
| Device List | Service related device list | Camera, Microphone, TV, etc. |
| Possibility | Serviceable or not at present | YES, NO |
| Status | Operating or not at present | YES, NO |

The device management module 420, for example, may acquire information on functions that the electronic device incorporated in the communication system may provide, and may store the acquired information as resource information through the resource storage module 410. For example, the device management module 420 may provide an interface such that the plurality of electronic devices may provide one or more services together interworking with each other. To this end, the device management module 420 may include, for example, a connection management module 422, a state information management module 424, and an event management module 426. According to an embodiment, the device management module 420 may manage information on the electronic devices incorporated in the communication system (e.g., attribute information relating to the device profile table 412).

According to various embodiments, the electronic device 400 may be the sixth electronic device 160 illustrated in FIG. 1. According to an embodiment, the first electronic device 110 illustrated in FIG. 1, when accessing the electronic device 400 first, may transmit the identification information (e.g., MAC address) for the first electronic device 110 to the electronic device 400. When the identification information is determined to be, for example, new identification information not stored in the device profile table 412 in advance, the electronic device 400 may store the identification information in the device profile table 412. In addition, for example, the electronic device 400 may request information (e.g., device address of Table 1) for at least some fields included in the device profile table 412 from the first electronic device 110. The first electronic device 110 may be registered as a device incorporated in the communication system (e.g., the communication system 101) by transmitting the requested information to the electronic device 400.

According to an embodiment, the second electronic device 120 illustrated in FIG. 1 may be registered as a part of the communication system (e.g., the communication system 101) in the electronic device 400 through the first electronic device 110. Operations the same as or similar to the registration operation of the first electronic device 110 may be omitted. The identification information of the second electronic device 120, for example, may be registered in the communication system (e.g., the communication system 101) in conjunction with the identification information of the first electronic device 110 functioning as a main electronic device. Furthermore, for example, inputs or outputs used in the registration process of the second electronic device 120 may be performed through the first electronic device 110.

The connection management module 422, for example, may identify an electronic device entering or exiting the coverage of a communication system. According to an embodiment, when an unregistered electronic device is recognized, the connection management module 422 may transmit, to the recognized electronic device, information for inquiring whether to register the same in the communication system (e.g., the communication system 101). For example, the connection management module 422 may request attribute information corresponding to a filed included in the device profile table 412 from the recognized electronic device. When the attribute information related to the device profile is received, the connection management module 422 may update the device profile table 412 using the received attribute information.

The state information management module 424, for example, may identify state information of resources or functions available in a communication system. The state information may include, for example, at least one of presence/absence of a function, a user, authority, a location, a priority, performance, available power, an available storage space, a communication speed, a travelling speed, a locking state, a reserved task, and an executed application. The state information management module 424, when the states of resources are changed, may make a request for updating to the resource storage module 410.

The event management module 426, for example, may identify whether a condition for a service change occurs in regard to the electronic devices incorporated in the communication system. According to an embodiment, in cases where the change of state information identified by the state information management module 424 satisfies a specified condition, the event management module 426 may transmit, for example, information on the electronic device of which the state information has been changed, to the service determination module 430. For example, the event management module 426 may transmit information to enable the service determination module 430 to determine a service to change.

The service determination module 430, for example, may determine whether to change a service provided by a communication system. The service determination module 430 may include, for example, a rule providing module 432. According to an embodiment, the service determination module 430 may select an electronic device to be used to provide a service from a plurality of electronic devices incorporated in the communication system (e.g., the communication system 101) by exchanging information with the resource storage module 410 or the device management module 420. The rule providing module 432, for example, may manage information on priorities between a plurality of electronic devices requesting a service change, information on time or location a service may be changed, and the like.

The service management module 440, for example, may process tasks relating to the creation, change, or removal of a service provided within the coverage of a communication system (e.g., the communication system 101). According to an embodiment, the service management module 440 may transmit the information relating to the creation, change, or removal of the service to at least one electronic device pertaining to the communication system. According to an embodiment, the service management module 440 may update, to the service table 418, the current states of services that the electronic devices (e.g., the electronic devices 110, 120, 130, 140, 150 and 160) provide individually or in conjunction with each other. The service management module 440 may include, for example, a service combination module 442. The service combination module 442 may create a service by combining resources included in a communication system (e.g., the communication system 101) and the service.

For example, when the device management module 420 receives a request for a service change from an electronic device (e.g., the first electronic device 110), the service management module 440 may transmit service performance information (e.g., the type of executed service, whether a service is executed, and the like) of another electronic device (e.g., the fifth electronic device 150) to the service determination module 430. According to an embodiment, the service management module 440 may transmit information on available resources and electronic devices to the electronic device (e.g., the first electronic device 110).

Figure 5:
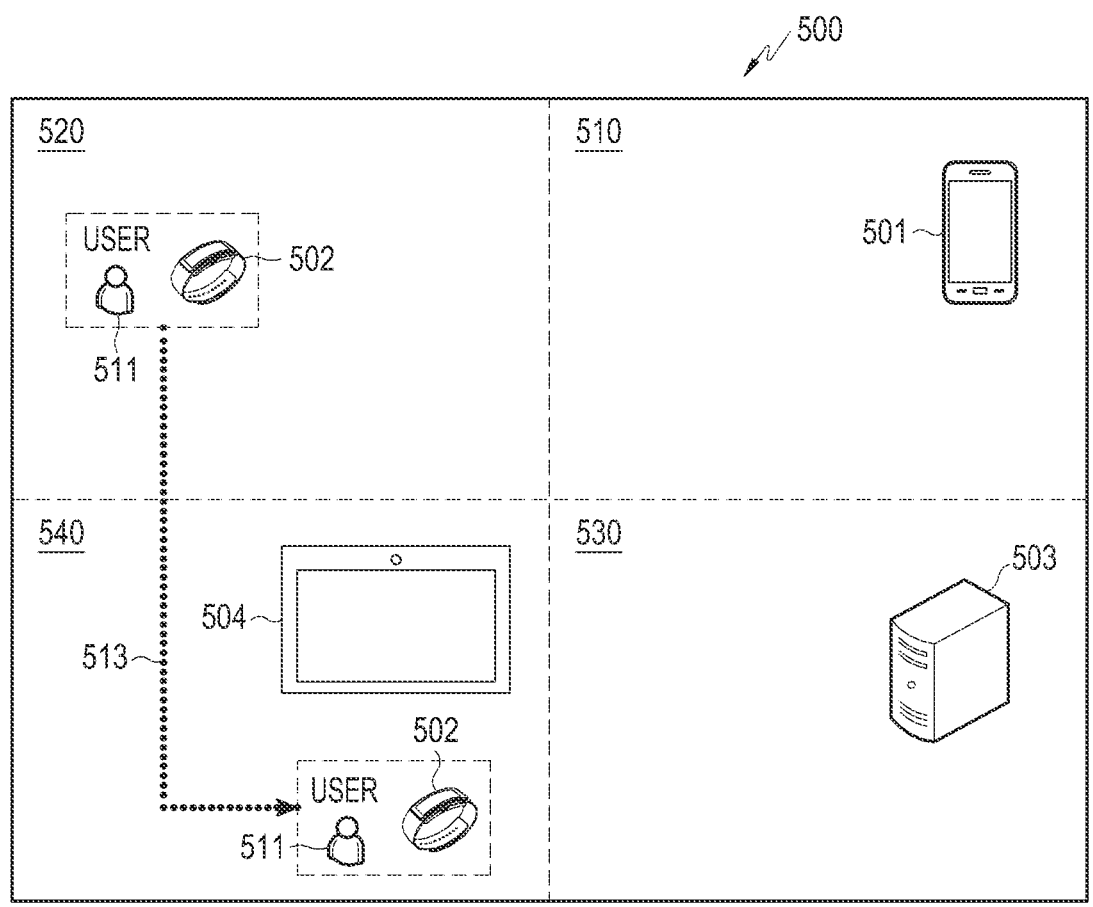
FIG. 5 illustrates an example of changing a service by an electronic device pertaining to a communication system, according to various embodiments of the present disclosure.

FIG. 5 illustrates an example of changing a service by an electronic device pertaining to a communication system (e.g., the communication system 101), according to various embodiments. A communication system according to this embodiment may be, for example, the communication system 101 illustrated in FIG. 1 or an environment including a plurality of electronic devices connected through the second network 264 illustrated in FIG. 2.

Referring to FIG. 5, a communication system 500 may include a first subarea 510, a second subarea 520, a third subarea 530, and a fourth subarea 540. The communication system 500 may include, for example, the first electronic device 501, a second electronic device 502, a third electronic device 503, and a fourth electronic device 504. Each of the electronic devices 501, 502, 503 and 504, according to this embodiment, may correspond to, for example, at least one of the first to sixth electronic devices 110, 120, 130, 140, 150 and 160 illustrated in FIG. 1.

According to an embodiment, the communication system 500 may be a local network established indoors or outdoors. The communication system 500 may be, for example, a home network system or a cloud system that is constituted in units of homes, offices, stores, and the like. The first to fourth electronic devices 501 to 504, adjacent to or within the area of the communication system 500, may be interconnected through wired or wireless communication to establish a network and, for example, may also be controlled by a specified electronic device (e.g., the third electronic device 503) when performing specified operations. The third electronic device 503, according to this embodiment, may be a home gateway or a server (e.g., the sixth electronic device 160 illustrated in FIG. 1).

According to an embodiment, as illustrated in FIG. 5, each of the first to fourth electronic devices 501 to 504 may be located in any one of the first to fourth subareas 510, 520, 530 and 540. For example, the first electronic device 501 may be located in the first subarea 510, the second electronic device 502 in the second subarea 520, the third electronic device 503 in the third subarea 530, and the fourth electronic device 504 in the fourth subarea 540.

According to an embodiment, an electronic device located in a specified subarea may provide a service to a user or change a currently provided service into another service using one or more electronic devices located in other subareas. For example, the first electronic device 501 may provide (e.g., change) a service using functions included in the second to fourth electronic devices 502 to 504 located in the second to fourth subareas 520, 530, 540, respectively.

According to an embodiment, in cases where an electronic device located in a specified subarea enters another subarea, the electronic device may change a first service into a second service and provide the second service to a user 511 using an electronic device located in the another subarea. For example, when the second electronic device 502 enters the first subarea 510 where the first electronic device 501 is located, the first electronic device 501 may continue to provide a first service or may change the first service into a second service and provide the second service on the basis of a function available in the second electronic device 502.

The movement of the first to fourth electronic devices 501 to 504 may be identified, for example, through a camera included in the communication system 500 (e.g., the fourth electronic device illustrated in FIG. 1). In addition, the movement of the electronic devices may also be identified through location determination technology using a GPS, Wi-Fi, and the like. According to some embodiments, the movement of the electronic devices may also be identified through sensors (e.g., a motion sensor, a touch sensor, a proximity sensor, and the like) mounted on doors provided at entrances of the subareas.

According to various embodiments, the fourth electronic device 504 may be an audio device including a speaker. According to an embodiment, when the first electronic device 501 enters the fourth subarea 504 while playing back music through a speaker included therein, the first electronic device 501 may play back the music through the speaker included in the fourth electronic device 504. For example, the first electronic device 501, when connected to the speaker included in the fourth electronic device 504, may change a sound source file (or multimedia source file) used in the playback into another sound source file. The another sound source file may be a sound source file having audio data of a higher quality than the existing sound source file. According to some embodiments, some information (e.g., lyrics) relating to the playback of the music may continue to be provided through the first electronic device 501.

According to various embodiments, the fourth electronic device 504 may recognize contextual information related to reading, occurring in the first electronic device 501, and may automatically perform a service corresponding to the contextual information related to the reading. For example, when an e-book application is executed in the first electronic device 501, the fourth electronic device 504 may play back music related to the e-book application. For instance, the fourth electronic device 504 may automatically select music to be played back in the fourth electronic device 504, according to the type or genre of content provided through the e-book application, or a person, a place, or a building included in the content.

According to an embodiment, the second electronic device 502 may provide a first service (e.g., a voice call) to the user 511 in the communication system 500 (e.g., the second subarea 520). The providing of the first service may be performed, for example, by an instruction of the user 511 or a request by another electronic device inside/outside the communication system 500. For example, the first electronic device 501 may receive a request for a video call from an external electronic device (e.g., the seventh electronic device 170). In cases where a cellular network is used, the request may be transmitted from the external electronic device to the first electronic device 501 through a base station (not illustrated). The first electronic device 501 having received the request may transmit a notification of the request to the second electronic device 502 in cases where the second electronic device 502 is connected to the first electronic device 501.

The request for the video call may be transmitted to the second electronic device 502, for example, through short-range communication (e.g., Bluetooth or Wi-Fi). The second electronic device 502 having received the notification may provide, to the user 511, information on the corresponding notification through an input/output device (e.g., the display 260) operatively connected to the second electronic device 502. The user 511, when recognizing the information on the notification, may accept the call, for example, through a user interface (e.g., a GUI) provided through the input/output device.

According to an embodiment, the second electronic device 502 may perform a voice call in response to the video call request. For example, the external device (e.g., the seventh electronic device 170) may provide a video or voice call to a user of the external device (e.g., the seventh electronic device 170), and the second electronic device 502 may provide a voice call to a user of the second electronic device 502. According to various embodiments, in cases where the call request relates to image information, an operation of processing the call request into a first service (voice call) not including image information may be performed in the first, second, or third electronic device 501, 502, or 503. According to an embodiment, in cases where a function suitable for the performance of a video call is not included in the second electronic device 502, the second electronic device 502 may change the video call into a voice call and provide the same to the user 511. According to some embodiments, when it is identified that the user wearing the second electronic device 502 is a specified distance or more from the first electronic device 501, the first electronic device 501 may exchange only a voice signal for a voice call with the second electronic device 502. According to an embodiment, the voice signal may use a signal generated in real time, and the video signal may use video pre-stored in the first, second, or third electronic device 501, 502, or 503.

According to an embodiment, the first electronic device 501 may process video received from the external device (e.g., the seventh electronic device 170) and transmit the processed video to the second electronic device 502. For example, the first electronic device 501 may create an image available in the second electronic device 502 by capturing the received video at specified time periods (e.g., about 1 second). The first electronic device 501 may provide a voice call service including photo-streaming to a user by transmitting the created image together with a voice to the second electronic device 502. The operation of creating the image from the received video may be based on, for example, the type or movement of an object (e.g., a face, a building, an article, and the like) included in the received video. For example, the image may be captured in cases where the size or location of an object corresponding to a counterpart's face included in the received video is changed.

According to some embodiments, the third electronic device 503 may recognize that the first electronic device 501 has received a video call request. For example, when it is identified that the user 511 is a specified distance (e.g., about 10 meters) or more from the first electronic device 501 or is in another subarea (e.g., the second subarea 520), the third electronic device 503 may change the video call into a voice call and transmit the voice call to the second electronic device 502. According to some embodiments, the third electronic device 503 may control the second or fourth electronic device 502 or 504 such that a voice signal among signals for a video call uses the second electronic device 502 and a video signal for the video call uses a closer device (e.g., the fourth electronic device 504) among the devices incorporated in the communication system 500. According to some embodiments, in cases where a plurality of users are near different types of electronic devices in different subareas in the communication system 500, mutually different second services suitable for the locations of the plurality of users may be generated almost simultaneously or sequentially.

In response to a request for a video call service, the first electronic device 501 may provide the video call service, for example, in the first subarea 510. According to an embodiment, the user 511 may be in the first subarea 510, and another user (not illustrated) may be in the fourth subarea 540. In this case, the video call service may also be provided, for example, through the fourth electronic device 540 in the fourth subarea 540. Accordingly, the video call service may be changed into a service for three or more users (e.g., one-to-N video call service). In regard to the change of the video call service, for example, the first, third, or fourth electronic device 501, 503, or 504 may synthesize video data acquired from the first and fourth electronic devices 501, 504 and transmit the synthesized video data through the first electronic device 501. In addition, for example, a communication channel for the video call service may be additionally created by the first, third, or fourth electronic device 501, 503, or 504.

According to an embodiment, the second electronic device 502 may move from the second subarea 520 (e.g., a study) to the fourth subarea 540 (e.g., a living room). For example, when the second electronic device 502 is identified or expected to enter the fourth subarea 540, the second electronic device 502 may identify a function (e.g., camera) available in the fourth electronic device 504 located in the fourth subarea 540. The second electronic device 520, for example, may change (or convert) a first service (e.g., a voice call) into a second service (e.g., a video call) on the basis of the function available in the fourth electronic device 504. According to some embodiments, the second electronic device 502 may select an electronic device capable of providing a camera function from a plurality of electronic devices located in the fourth subarea 540 on the basis of the state information of the plurality of electronic devices.

According to an embodiment, the fourth electronic device 504 may provide a camera function while being connected to another electronic device (not illustrated). In this case, when the second electronic device 502 enters the fourth subarea 540 to request the fourth electronic device 504 to provide the camera function, the third electronic device 503 (e.g., server) or the fourth electronic device 504 may determine whether to change an electronic device to which the fourth electronic device 504 will provide the camera function. For example, if the another electronic device (not illustrated) is a device with a camera and the second electronic device 502 is a device without a camera, the camera function included in the fourth electronic device 504 may not be provided to the another electronic device, but may be provided to the second electronic device 502.

According to an embodiment, the second electronic device 502 may determine a service change on the basis of the relative location between the second and fourth electronic devices 502 and 504. For example, the second electronic device 502 may move along a travelling path 513 from the second subarea 520 to the fourth subarea 540. Even though the second electronic device 502 is identified to be located in the fourth subarea 540, the service change may be performed, for example, only when the second electronic device 502 or the user of the second electronic device 502 is at an appropriate location or distance for using the fourth electronic device 504 (e.g., on the front side of the fourth electronic device).

According to some embodiments, in cases where it is identified that a plurality of electronic devices exist in the fourth subarea 540 where the second electronic device 502 has entered, the second electronic device 502 may select at least one function or electronic device to be used to provide a second service, according to the relative locations or distances between the electronic devices. According to an embodiment, the travelling path 513 may also be identified through another electronic device (e.g., CCTV) incorporated in the communication system 500.

According to an embodiment, the second electronic device 502 may determine a service change on the basis of the state information of the second or fourth electronic device 502 or 504. For example, the fourth electronic device 504 may perform another service using a device (e.g., camera) operatively connected to the fourth electronic device 504. In this case, the service using the device (e.g., camera) operatively connected to the fourth electronic device 504 may not be provided. According to this embodiment, in cases where the priority of the service which the fourth electronic device 504 performs using the device (e.g., camera) operatively connected thereto is lower than that of a service which the second electronic device 502 wants to perform using the device (e.g., camera) operatively connected to the fourth electronic device 504, the device (e.g., camera) operatively connected to the fourth electronic device 504 may be used in the change of a service.

According to an embodiment, while the second electronic device 502 is providing a service in the fourth subarea 540 using a function of the fourth electronic device 504, the fifth electronic device (not illustrated) may enter the fourth subarea 540 to request the fourth electronic device 504 to provide a function. In cases where the fifth electronic device (not illustrated) requests the fourth electronic device 504 to provide, for example, a function that is being provided to the second electronic device 502, the fourth electronic device 504 may stop providing the function to the second electronic device 502 and may provide the corresponding function to the fifth electronic device on the basis of the state information of the second electronic device 502 or the fifth electronic device. For example, in cases where a user (not illustrated) of the fifth electronic device has a higher priority than the user 511 of the second electronic device 502, the fourth electronic device 504 may provide, to the fifth electronic device, the function which is being provided to the second electronic device 502.

In this case, the fourth electronic device 504 may provide, to the second electronic device 502, another function the same as or similar to that previously provided to the second electronic device 502. Accordingly, the second electronic device 502 may maintain the previously provided service without changing the same. According to some embodiments, the second electronic device 502 may request a different function from the previously provided function from the fourth electronic device 504 and modify at least a part of the previously provided service using the different function. For example, the second electronic device 502 may perform a packet call using a wireless LAN module included in the fourth electronic device 504. According to this embodiment, in cases where the providing of the wireless LAN module is halted, the second electronic device 502 may change the packet call into a circuit call using a cellular module included in the fourth electronic device 504. According to some embodiments, the fifth electronic device may also maintain the function provided to the second electronic device 502 on the basis of the state information of the second electronic device 502 or the fifth electronic device. The providing or maintaining of the function, according to this embodiment, may also be performed, for example, under the control of the third electronic device 503.

According to an embodiment, the type of service to be provided using the second and fourth electronic devices 502 and 504 may also be determined on the basis of a user of the second electronic device 502. For example, the fourth electronic device 504 may be a tablet computer with a digital pen. For example, in cases where a first user (e.g., the user 511) performing a voice call through the second electronic device 502 enters the fourth subarea 540, the second electronic device 502 may provide a video call service, including a memo function, which uses the digital pen of the fourth electronic device 504. In addition, for example, in cases where a second user (not illustrated) performing a voice call through the second electronic device 502 enters the fourth subarea 540, the second electronic device 502 may provide a video call service, including a function that the second user may write text or draw a picture on video through handwriting, which uses the digital pen of the fourth electronic device 504.

According to an embodiment, a function which the fourth electronic device 504 may provide to the first or second electronic device 501 or 502 may include a device operatively connected to the fourth electronic device 504. For example, the function which the fourth electronic device 504 may provide to the first or second electronic device 501 or 502 may include a device (hereinafter, for convenience of description, referred to as a "partial device") that may be detachably coupled to the fourth electronic device 504. The partial device may include various accessories or appcessories, for example, an electronic pen, a cover device, a smart cover device, an external display device, a communication module, and the like. According to an embodiment, in cases where the partial device (e.g., electronic pen) operatively connected to the fourth electronic device 504 is used as an input device of the first electronic device 501 or brought close to (e.g., attached to) the first electronic device 501, a first service provided from the first electronic device 501 may be changed into a second service different from the first service. According to some embodiments, in cases where the partial device (e.g., electronic pen) is used as an input device of the second electronic device 502 or brought close to (e.g., attached to) the second electronic device 502, a first service provided from the second electronic device 502 may be changed into a third service different from the first and second services.

According to various embodiments, the fourth electronic device 504 may provide a camera function included therein in response to a request of the first electronic device 501 which is providing a first service (e.g., a voice call). The fourth electronic device 504, for example, may provide an electronic pen function included therein in response to a request of the second electronic device 502 which is providing a first service (e.g., a voice call). For example, a service that is changed using an external device (e.g., the fourth electronic device 504) may vary with the type, user, state information, and service of an electronic device (e.g., the first electronic device 501) requesting the change of the service.

According to an embodiment, in cases where an available function in the fourth electronic device 504 is also available in the second electronic device 502, the second electronic device 502 may provide a service utilizing both the functions. For example, when the second electronic device 502 performs a service relating to a 2D-face recognition technology using an image sensor included in the second electronic device 502, the second electronic device 502 may also use an image sensor included in the fourth electronic device 504 together and thus switch to a service relating to a 3D-face recognition technology using a plurality of image sensors. According to some embodiments, when a function included in the second electronic device 502 is converted from an available state to an unavailable state and a function the same as or similar to that included in the second electronic device 502 is available in the fourth electronic device 504, the second electronic device 502 may also provide a service using the function included in the fourth electronic device 504.

According to some embodiments, the type of a second service may also be determined depending upon the state information of the second or fourth electronic device 502 or 504. According to some embodiments, after the user 511 moves from the second subarea 520 to the first subarea 510, the user 511 may move together with the first and second electronic devices 501 and 502 to the fourth subarea 540. In this case, the type of second service may be determined depending upon the first and second electronic devices 501 and 502. For example, in cases where the second electronic device 502 is a headset device, a voice signal for a video call may be provided through the second electronic device 502. One part of a screen displayed for the video call may be provided, for example, through the first electronic device 501, and another part of the screen may be provided, for example, through the fourth electronic device 504. According to some embodiments, the first and second electronic devices 501 and 502 may be moved to the fourth subarea 540 by the same user (e.g., the user 511) at different time points. In addition, for example, the first and second electronic devices 501 and 502 may also be moved to the fourth subarea 540 by different users at different time points. Detailed descriptions of contents similar to the above described operations will be omitted.

According to various embodiments, the communication system 500 and the subareas (e.g., the first to fourth subareas 510, 520, 530 and 540) may correspond to various system environments. For example, the communication system 500 may correspond to a vehicle, such as an automobile, an airplane, a vessel, and the like, and the subareas may correspond to seats or sections of the vehicle.

Figure 6:
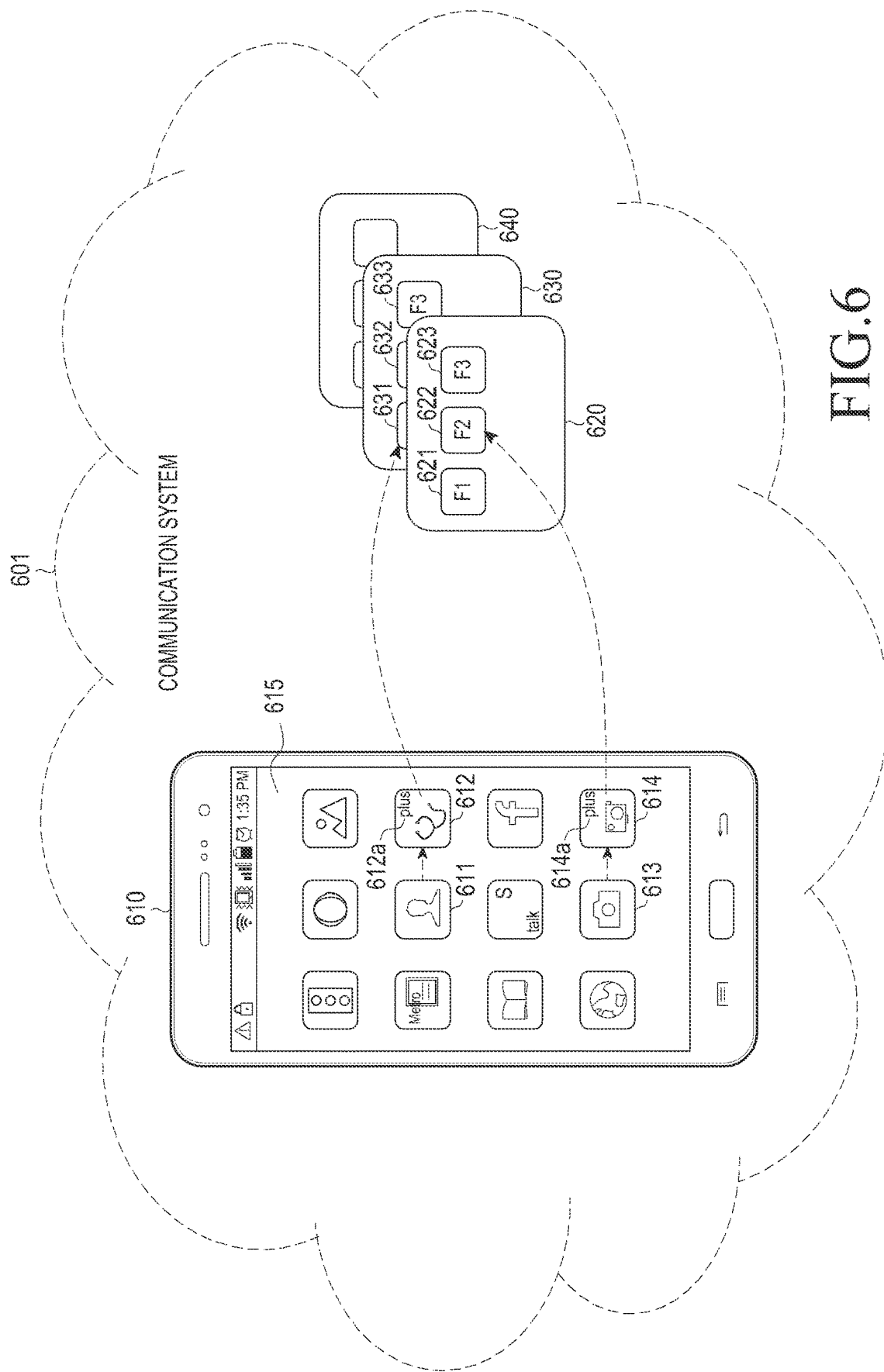
FIG. 6 illustrates an example of providing a service by an electronic device pertaining to a communication system, according to various embodiments of the present disclosure.

FIG. 6 illustrates an example of providing a service by an electronic device (e.g., the electronic device 201) pertaining to a communication system (e.g., the communication system 101), according to various embodiments of the present disclosure.

Referring to FIG. 6, a communication system 601 may include an electronic device 610, a first external device 620, a second external device 630, and a third external device 640. The electronic device 610 and the first to third external devices 620, 630 and 640, according to this embodiment, may correspond to at least one of the first to sixth electronic devices 110, 120, 130, 140, 150 and 160 illustrated in FIG. 1. According to an embodiment, the electronic device 610 may display a first user interface 611, a second user interface 612, a third user interface 613, and a fourth user interface 614 on a display screen 615 thereof. The first to fourth user interfaces 611 to 614 may be displayed on the screen, for example, as image objects (e.g., icons). In addition, for example, the coordinates of the first to fourth user interfaces 611 to 614 displayed on the screen are associated with a touch panel (e.g., a touch panel 1052 illustrated in FIG. 10), and the electronic device 610 may detect an input, by a user or an input tool, through the touch panel.

Figure 10:
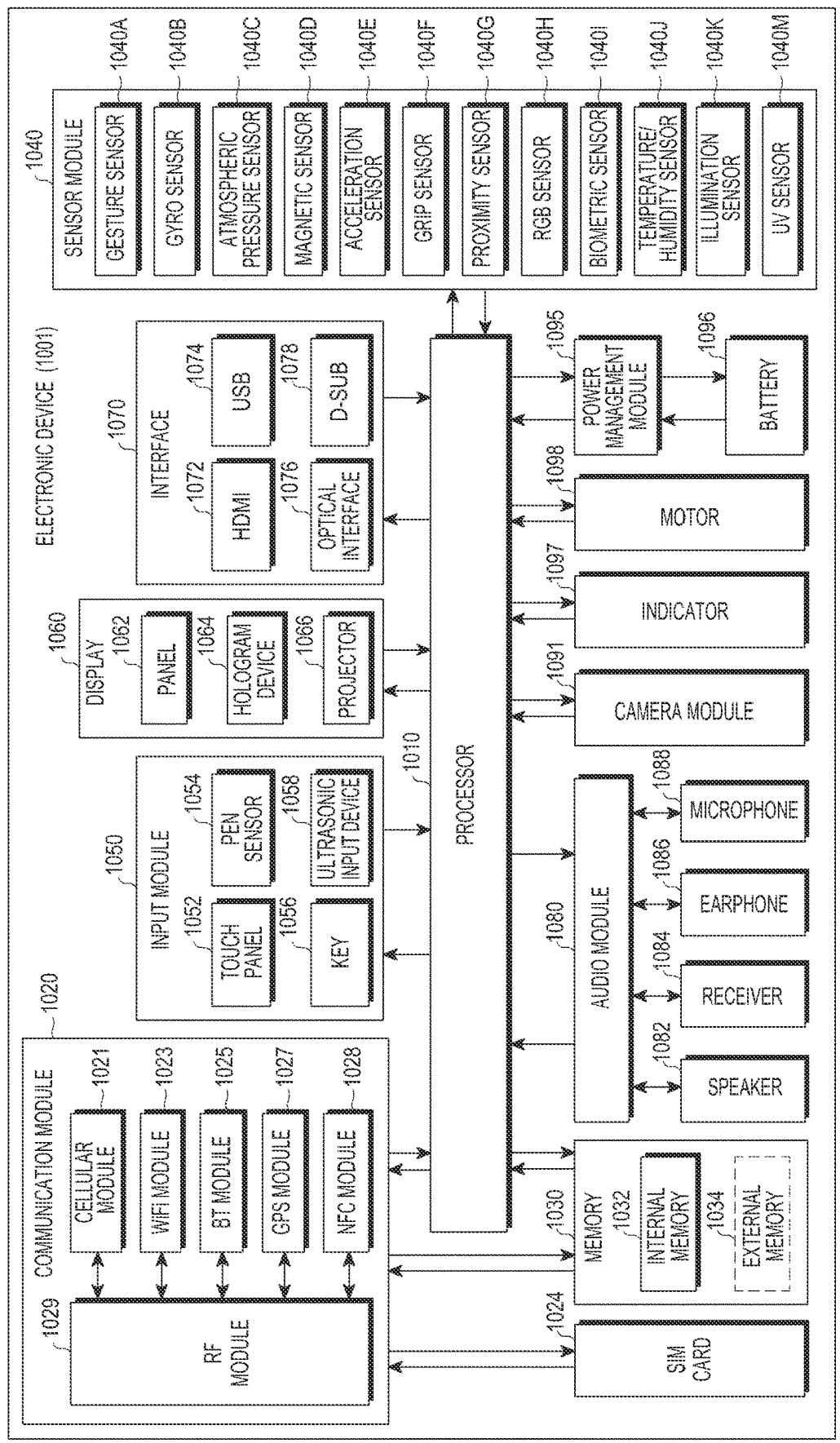
FIG. 10 is a block diagram of an electronic device according to various embodiments of the present disclosure.

According to an embodiment, when the user selects, for example, the first user interface 611, the electronic device 610 may provide a work-rate measurement service using a sensor included therein (e.g., the acceleration sensor 1040E illustrated in FIG. 10). When the user selects, for example, the third user interface 613, the electronic device 610 may provide a 2D image filming service using an image sensor included therein (e.g., a camera module 1091 illustrated in FIG. 10).

According to an embodiment, the electronic device 610 may change the work-rate measurement service or the 2D image filming service into another service using a function included in at least one of the first to third external devices 620, 630 and 640 pertaining to the communication system 601. According to this embodiment, the first external device 620 may include, for example, a first function 621, a second function 622, and a third function 623. The second external device 630 may include, for example, a fourth function 631, a fifth function 632, and a sixth function 633. The functions may include at least one of hardware devices or software programs installed in the external devices.

According to an embodiment, in cases where a function included in at least one of the first to third external devices 620, 630 and 640 pertaining to the communication system 601 may be provided for a service performed in the electronic device 610, the electronic device 610 may display information representing that on the display screen 615. For example, the second user interface 612 may be created when the fourth function 631 is available for a service executed in the electronic device 610. For example, the fourth user interface 614 may be created and displayed on the display screen 615 when the second function 622 is available for a service executed in the electronic device 610. Additionally, for example, a badge image (e.g., a badge 612*a* or 614*a*) representing that a service is provided using at least an external device may also be displayed on the display screen 615 in regard to the second or fourth user interface 612 or 614.

In FIG. 6, one example of creating and changing an icon is illustrated. However, this embodiment is not limited thereto, and the electronic device 610 may also display a user interface (e.g., a popup menu) on an execution screen of an application relating to the providing of a service. According to an embodiment, when a user selects a service change using the user interface, the electronic device 610 may change a currently provided service into another service. According to some embodiments, without displaying a user interface requiring a user selection, the electronic device 610 may also automatically change a service and present information notifying of the change of the service through the electronic device 610 or an external device (e.g., the first, second, or third external device 620, 630, or 640).

According to an embodiment, while providing a work-rate measurement service, the electronic device 610 may change the work-rate measurement service into a health care service using the fourth function 631 (e.g., a biometric sensor) of the second external device 630. According to an embodiment, while providing a 2D image filming service, the electronic device 610 may change the 2D image filming service into a 3D image filming service using the second function 622 (e.g., an image sensor) of the first external device 620.

According to various embodiments, an electronic device may include: a service providing module that provides a first service in response to a service request; a function identification module that identifies at least one function relating to the first service, which is available in another electronic device external to the electronic device; and a service change module that provides a second service relating to the service request on the basis of the at least one function.

According to various embodiments, the function identification module may identify the at least one function on the basis of the location of the electronic device relative to the another electronic device.

According to various embodiments, the function identification module may identify the at least one function through the electronic device and a server connected to the another electronic device.

According to various embodiments, the function identification module may select a function not included in the electronic device as the at least one function.

According to various embodiments, the service change module may change the first service into a second service relating to the service request on the basis of the at least one function.

According to various embodiments, the service change module may determine the second service further based on state information of at least one of the electronic device and the another electronic device.

According to various embodiments, the state information may include the type of corresponding electronic device among the electronic device and the another electronic device.

According to various embodiments, the state information may include the type of yet another electronic device connected to the another electronic device, or a service providing state of the another electronic device for the yet another electronic device.

According to various embodiments, the service change module may determine the second service further based on specified content acquired in regard to the first service.

According to various embodiments, the first service may include voice information, and the second service may include the voice information and video information.

According to various embodiments, the service change module may provide at least a part of the second service through the electronic device and transmit a request to the another electronic device such that another part of the second service is able to be provided through the another electronic device.

According to various embodiments, provided is a storage medium having instructions stored therein. The instructions are configured to make at least one processor perform at least one operation when being executed by the at least one processor, in which the at least one operation may include: providing a first service in response to a service request by a first electronic device; identifying at least one function relating to the first service, which is available in a second electronic device external to the first electronic device; and providing a second service relating to the service request on the basis of the at least one function.

According to various embodiments, the providing of the second service may include changing the first service into the second service relating to the service request.

According to various embodiments, the providing of the second service may include determining the second service further based on state information of at least one of the first and second electronic devices.

According to various embodiments, the at least one operation may further include: providing at least a part of the second service through the first electronic device; and transmitting, by a first electronic device, a request to the second electronic device such that another part of the second service is able to be provided through the second electronic device.

According to various embodiments, an electronic device may include: a first identification module (e.g., the service management module 440) that identifies a first service performed in a first external device; a second identification module (e.g., the device management module 420) that identifies state information of at least one of the first external device and a second external device; and a change module (e.g., the service determination module 430) that changes the first service into a second service on the basis of the state information of the at least one external device.

According to various embodiments, the second service may be determined on the basis of a first function used to provide the first service in the first external device and a second function available in the second external device.

According to various embodiments, the electronic device may further include a memory that stores first function information on the first function and second function information on the second function.

Figure 7:
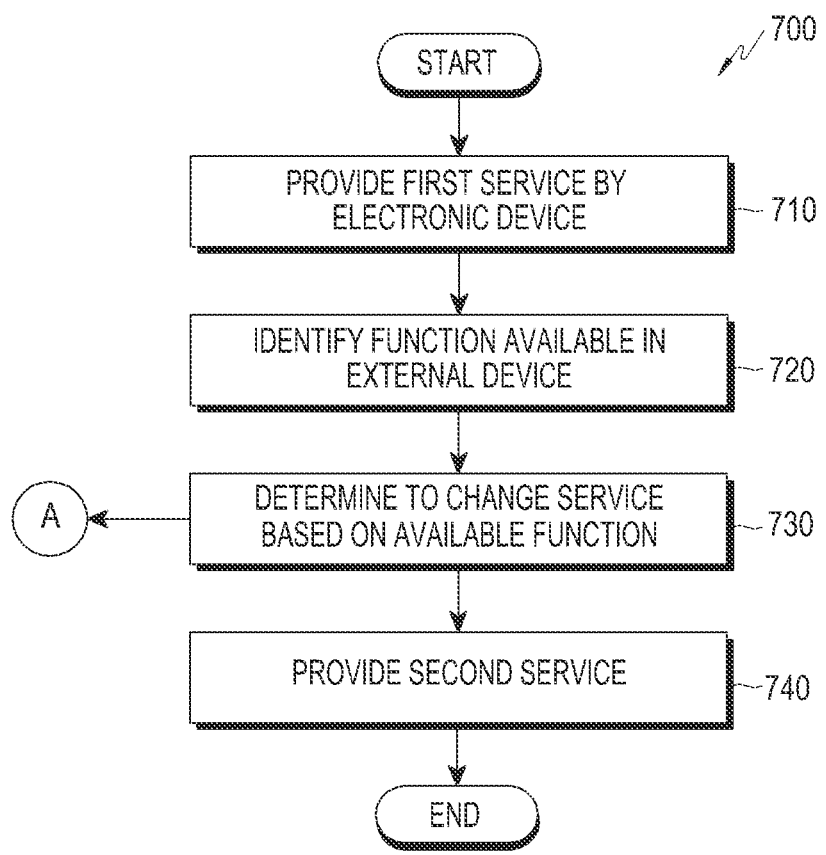
FIG. 7 is a flowchart illustrating a method of providing a service by an electronic device, according to various embodiments of the present disclosure.

FIG. 7 is a flowchart illustrating a method of providing a service by an electronic device (e.g., the electronic device 201), according to various embodiments of the present disclosure.

Referring to FIG. 7, in operation 710, in method 700, for example, an electronic device (e.g., the service providing module 310) may provide a first service in response to a service request.

In operation 720, for example, the electronic device (e.g., the function identification module 320) may identify at least one function available in an external device which is external to the electronic device. For example, the at least one function may be determined on the basis of the location of the electronic device in a communication system (e.g., the communication system 101) to which the electronic device pertains. For example, the at least one function may be determined on the basis of the location change of the external device in the communication system (e.g., the communication system 101) to which the electronic device pertains.

In operation 730, for example, the electronic device (e.g., the service change module 330) may determine whether to change the first service into a second service relating to the service request on the basis of the at least one function. For example, the type of the second service may be determined on the basis of the state information of the external device. Additional operations (A) for the operation 730 will be described below, for example, in connection with FIG. 8.

In operation 740, for example, the electronic device (e.g., the service change module 330) may provide the second service relating to the service request on the basis of the at least one function available in the external device. For example, the electronic device may provide one part of the second service therethrough, and may make an execution request for another part of the second service to the external device to provide the another part of the second service through the external device.

Figure 8:
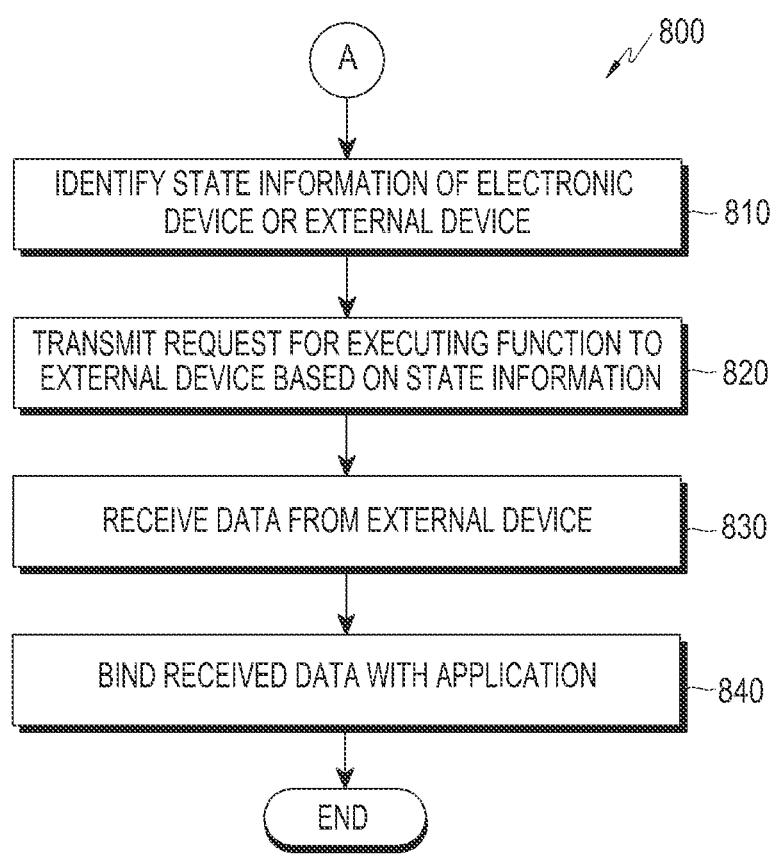
FIG. 8 is a flowchart illustrating a method of providing a service by an electronic device, according to various embodiments of the present disclosure.

FIG. 8 is a flowchart illustrating a method of providing a service by an electronic device (e.g., the electronic device 201), according to various embodiments of the present disclosure.

Referring to FIG. 8, in operation 810 of the method 800, for example, the electronic device (e.g., the service change module 330) may identify at least one piece of state information of the electronic device or the external device. The state information may be, for example, pre-specified information that affects the feasibility of a function included in the electronic device or the external device.

In operation 820, for example, the electronic device (e.g., the service change module 330) may transmit a request for executing a function to the external device on the basis of the identified state information. For example, the electronic device (e.g., the service change module 330) may determine whether the function sharing capability of the external device corresponds to a positive state on the basis of the current working state (e.g., preoccupancy or not of the function) or available power (e.g., residual battery quantity of about 50% or more) of the external device. When the function sharing capability of the external device is determined to correspond to the positive state, the electronic device (e.g., the service change module 330) may request the external device or a server to provide the function.

In operation 830, for example, the electronic device (e.g., the service change module 330) may receive data relating to the function, provided by the external device in response to the request, through a communication interface (e.g., the communication interface 270). The data may be, for example, content (e.g., a video, a voice, biometric information, and the like) created as a result which is obtained by performing the function included in the external device under the control of an application executed in the electronic device.

In operation 840, for example, the service providing module 310 may bind the data received in operation 830 with the application executed in the electronic device.

Figure 9:
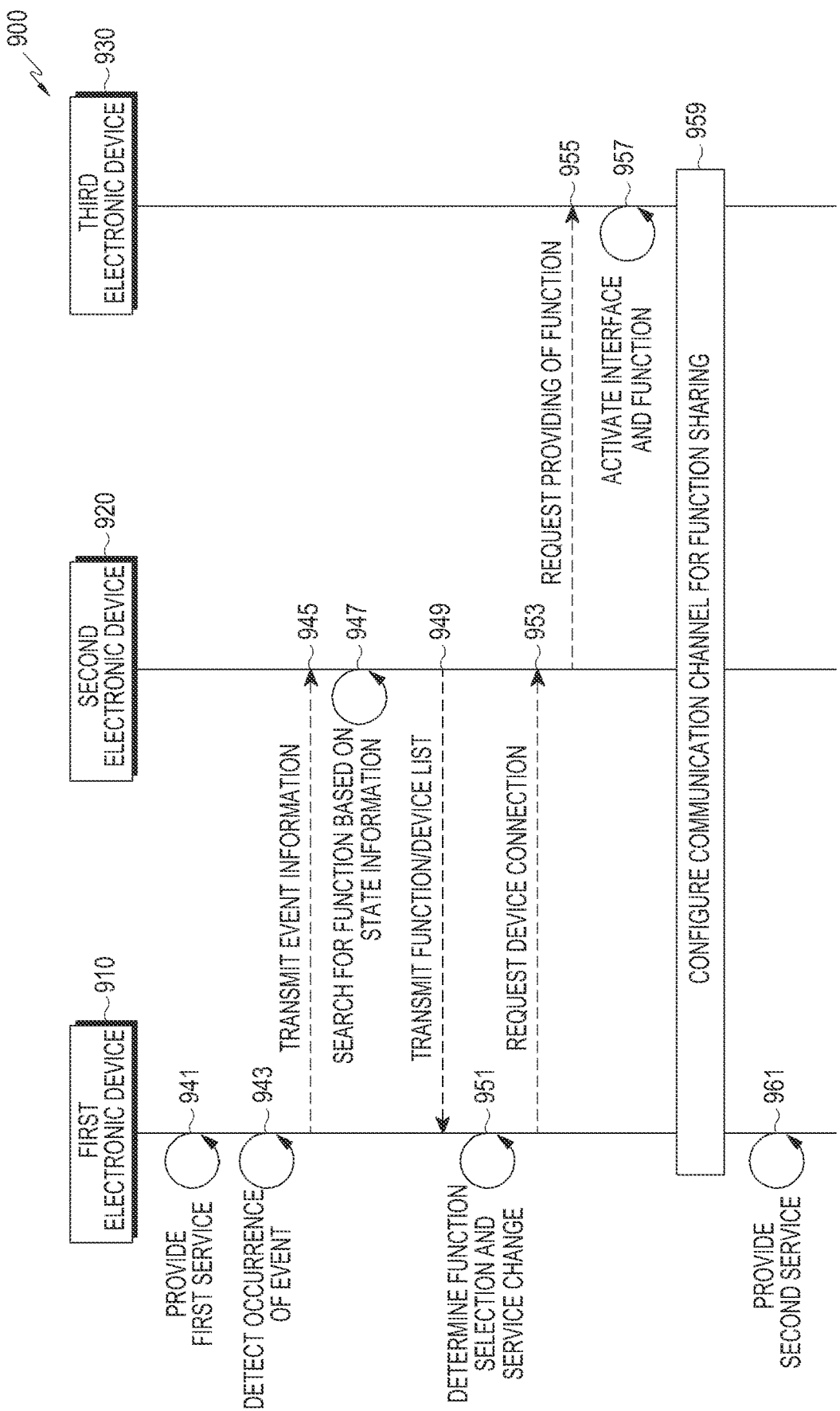
FIG. 9 is a flow diagram illustrating a method of providing a service in a communication system, according to various embodiments of the present disclosure.

FIG. 9 is a flow diagram illustrating a method of providing a service in a communication system (e.g., the communication system 101), according to various embodiments of the present disclosure.

Referring to FIG. 9, in method 900, each of first to third electronic devices 910, 920 and 930, according to this embodiment, may include at least one of the first to sixth electronic devices 110, 120, 130, 140, 150 and 160 illustrated in FIG. 1.

In operation 941, for example, the first electronic device 910 may provide a first service to a user.

In operation 943, for example, the first electronic device 910 may detect the occurrence of an event. According to an embodiment, the event may include the movement of the first electronic device 910 to a specified location. In operation 945, for example, the first electronic device 910 may transmit information relating to the detected event to the second electronic device 920.

In operation 947, for example, the second electronic device 920 may identify a function available in the third electronic device 930 on the basis of the state information of the third electronic device 930 connected to the second electronic device 920 through wired or wireless communication. According to an embodiment, in cases where the received event satisfies a condition for changing a service, the second electronic device 920 may identify the available function from at least one of a device profile table (e.g., the device profile table 412), a location table (e.g., the location table 414), a user table (e.g., the user table 416), and a service table (e.g., the service table 418) through a resource storage module (e.g., the resource storage module 410). According to an embodiment, the second electronic device 920 may identify the function available in the third electronic device 930 on the basis of the type of the first electronic device 910.

In operation 949, for example, the second electronic device 920 may transmit, to the first electronic device 910, at least one of the function identified in operation 947 and a device list for each function. In operation 951, for example, the first electronic device 910 may determine whether to change the first service into a second service on the basis of the received function and device list for each function. According to an embodiment, the first electronic device 910 may determine the second service on the basis of the state information of the third electronic device 930.

In operation 953, for example, the first electronic device 190 may transmit a request for connecting with the third electronic device 930 to the second or third electronic device 920 or 930. According to an embodiment, the first electronic device 910 may transmit, for example, at least one of information as to whether to change a service, a function relating to a service change, and the type of second service. In operation 955, for example, when it is identified that the first electronic device 910 having requested a function included in the third electronic device 930, the second electronic device 920 may transmit a request for providing the function to the third electronic device 930.

In operation 957, for example, the third electronic device 930 may activate the requested function in order to provide the function. According to an embodiment, the third electronic device 930 may perform rescheduling on a task for the corresponding function in order to provide the requested function. According to an embodiment, the third electronic device 930 may set up an interface with the first or second electronic device 910 or 920 in order to provide the requested function.

In operation 959, for example, the first electronic device 910 may configure a communication channel for function sharing with the third electronic device 930. According to an embodiment, the first electronic device 910 may be directly connected to the third electronic device 930. Additionally or alternatively, the first electronic device 91 may be connected to the third electronic device 930 through the second electronic device 920.

In operation 961, for example, the first electronic device 910 may provide the second service. According to an embodiment, one part of the second service may use a function included in the first electronic device 910, and another part of the second service may use a function included in the third electronic device 930.

According to some embodiments, the first electronic device 910 may also transmit information associated with the performance of the first service to the second electronic device 920, whether the event relating to operation 943 occurs. The second electronic device 920 may perform the operations following the operation 947 on the basis of the information associated with the performance of the first service. Detailed descriptions of contents similar to the above described operations will be omitted.

According to various embodiments, the operation of providing the service in operation 941 and a series of operations of changing the service in operations 943, 945, 947, 949, 951, 953, 955, 957 and 959 may be performed in a different order, simultaneously, or in parallel unlike those illustrated in FIG. 9.

According to various embodiments, a method of changing a service in a first electronic device may include: providing a first service in response to a service request; identifying at least one function relating to the first service, which is available in a second electronic device external to the first electronic device; and providing a second service relating to the service request on the basis of the at least one function.

According to various embodiments, the providing of the first service may include creating at least a part of a service corresponding to the service request as the first service using a function included in the first electronic device.

According to various embodiments, the identifying may include identifying the at least one function on the basis of the location of the first electronic device relative to the second electronic device.

According to various embodiments, the providing of the second service may include changing the first service into the second service relating to the service request on the basis of the at least one function.

According to various embodiments, the providing of the second service may include determining the second service further based on state information of at least one of the first and second electronic devices.

According to various embodiments, the state information may include at least one of a user, authority, a priority, performance, available power, an available storage space, a communication speed, a travelling speed, a locking state, and an executed application.

According to various embodiments, the state information may include the type of corresponding electronic device among the first and second electronic devices.

According to various embodiments, the providing of the second service may include determining the second service further based on specified content acquired in regard to the first service.

According to various embodiments, the method may further include: providing at least a part of the second service through the first electronic device; and transmitting, by a first electronic device, a request to the second electronic device such that another part of the second service is able to be provided through the second electronic device.

According to various embodiments, the providing of the second service may include: receiving, by the first electronic device, information acquired through the at least function from the second electronic device; and transmitting the acquired information to a third electronic device connected to the first electronic device.

FIG. 10 is a block diagram of an electronic device according to various embodiments of the present disclosure. The electronic device may include, for example, the entirety or a part of the electronic device 201 illustrated in FIG. 2.

Referring to FIG. 10, The electronic device 1001 may include at least one AP 1010, a communication module 1020, a Subscriber Identification Module 1024, a memory 1030, a sensor module 1040, an input device 1050, a display 1060, an interface 1070, an audio module 1080, the camera module 1091, a power management module 1095, a battery 1096, an indicator 1097, and a motor 1098.

The processor 1010 may, for example, control a plurality of hardware or software elements connected thereto and perform data processing and calculations on various types of data by driving an OS or application programs. The processor 1010 may be implemented, for example, as a system on chip (SoC). According to an embodiment, the processor 1010 may further include a graphic processing unit (GPU) and/or an image signal processor. The processor 1010 may also include at least some of the elements illustrated in FIG. 10 (e.g., a cellular module 1021). The processor 1010 may load instructions or data received from at least one of the other elements (e.g., a non-volatile memory) in a volatile memory to process the loaded instructions or data, and may store various types of data in a non-volatile memory.

The communication module 1020 may have a configuration the same as or similar to that of the communication interface 270 of FIG. 2. The communication module 1020 may include, for example, a cellular module 1021, a Wi-Fi module 1023, a Bluetooth module 1025, a GPS module 1027, an NFC module 1028, and a radio frequency (RF) module 1029.

The cellular module 1021 may, for example, provide a voice call, a video call, a text service, or an Internet service through a communication network. According to an embodiment, the cellular module 1021 may perform the distinction and authentication of the electronic device 1001 in a communication network using the subscriber identification module 1024 (e.g., a SIM card). According to an embodiment, the cellular module 1021 may perform at least some of the functions which the processor 1010 may provide. According to an embodiment, the cellular module 1021 may include a CP.

At least one of the Wi-Fi module 1023, the Bluetooth module 1025, the GPS module 1027, and the NFC module 1028 may include, for example, a processor for processing data transmitted/received through the corresponding module. According to some embodiments, at least some (two or more) of the cellular module 1021, the Wi-Fi module 1023, the Bluetooth module 1025, the GPS module 1027, and the NFC module 1028 may be included in one integrated chip (IC) or IC package.

The RF module 1029 may, for example, transmit/receive a communication signal (e.g., an RF signal). The RF module 1029 may include, for example, a transceiver, a power amp module (PAM), a frequency filter, a low noise amplifier (LNA), or an antenna. According to another embodiment, at least one of the cellular module 1021, the Wi-Fi module 1023, the Bluetooth module 1025, the GPS module 1027, and the NFC module 1028 may transmit/receive an RF signal through a separate RF module.

The subscriber identification module 1024 may include, for example, a card including a subscriber identification module and/or an embedded SIM, and contain unique identification information (e.g., an integrated circuit card identifier (ICCID)) or subscriber information (e.g., an international mobile subscriber identity (IMSI)).

The memory 1030 (e.g., the memory 230) may include, for example, an internal memory 1032 or an external memory 1034. The internal memory 1032 may include, for example, at least one of a volatile memory (e.g., a dynamic random access memory (DRAM), a static RAM (SRAM), a synchronous dynamic RAM (SDRAM), and the like), a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory)), a hard disc drive, and a solid state drive (SSD).

The external memory 1034 may further include a flash drive, for example, a compact flash (CF), a secure digital (SD), a micro secure digital (Micro-SD), a mini secure digital (Mini-SD), an eXtreme digital (xD), a multi-media card (MMC), a memory stick, and the like. The external memory 1034 may be operatively and/or physically connected to the electronic device 1001 through various interfaces.

The sensor module 1040 may, for example, measure a physical quantity or detect the operating state of the electronic device 1001 to convert the measured or detected information into an electric signal. The sensor module 1040 may include, for example, at least one of a gesture sensor 1040A, the gyro sensor 1040B, an atmospheric pressure sensor 1040C, a magnetic sensor 1040D, the acceleration sensor 1040E, a grip sensor 1040F, a proximity sensor 1040G, a color sensor 1040H (e.g., a Red, Green, and Blue (RGB) sensor), a biometric sensor 1040I, a temperature/humidity sensor 1040J, an illumination sensor 1040K, and a ultraviolet (UV) sensor 1040M. Additionally or alternatively, the sensor module 1040 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling one or more sensors included therein. In some embodiments, the electronic device 1001 may further include a processor, as a part of or separate from the processor 1010, which is configured to control the sensor module 1040, and may control the sensor module 1040 while the processor 1010 is in a sleep state.

The input device 1050 may include, for example, a touch panel 1052, a (digital) pen sensor 1054, a key 1056, or an ultrasonic input device 1058. The touch panel 1052 may use, for example, at least one of a capacitive type, a resistive type, an infrared type, and an ultrasonic type. Furthermore, the touch panel 1052 may further include a control circuit. The touch panel 1052 may further include a tactile layer to provide a tactile reaction to a user.

The (digital) pen sensor 1054 may include, for example, a recognition sheet which is a part of the touch panel or separate from the touch panel. The key 1056 may include, for example, a physical button, an optical key, or a keypad. The ultrasonic input device 1058 may detect ultrasonic waves generated by an input tool through a microphone (e.g., a microphone 1088) to identify data corresponding to the detected ultrasonic waves.

The display 1060 (e.g., the display 160) may include a panel 1062, a hologram device 1064, or a projector 1066. The panel 1062 may include a configuration the same as or similar to that of the display 160 of FIG. 1. The panel 1062 may be implemented to be, for example, flexible, transparent, or wearable. The panel 1062 may be formed to be a single module with the touch panel 1052. The hologram 1064 may show a three dimensional image in the air using interference of light. The projector 1066 may display an image by projecting light onto a screen. The screen may be located, for example, in the interior or on the exterior of the electronic device 1001. According to an embodiment, the display 1060 may further include a control circuit for controlling the panel 1062, the hologram device 1064, or the projector 1066.

The interface 1070 may include, for example, a HDMI 1072, a USB 1074, an optical interface 1076, or a D-sub-miniature (D-sub) 1078. The interface 1070 may be included, for example, in the communication interface 270 illustrated in FIG. 2. Additionally or alternatively, the interface 1070 may include, for example, a mobile high-definition link (MHL) interface, a SD card/MMC interface, or an infrared data association (IrDA) standard interface.

The audio module 1080 may bilaterally convert, for example, a sound and an electric signal. At least some elements of the audio module 1080 may be included, for example, in the input/output interface 250 illustrated in FIG. 2. The audio module 1080 may, for example, process sound information input or output through the speaker 1082, a receiver 1084, earphones 1086, the microphone 1088, and the like.

The camera module 1091 may be, for example, a device capable of filming a still image and a moving image and, according to an embodiment, may include one or more image sensors (e.g., a front sensor or a rear sensor), a lens, an image signal processor (ISP), or a flash (e.g., an LED or a xenon lamp).

The power management module 1095 may, for example, manage the power of the electronic device 1001. According to an embodiment, the power management module 1095 may include a power management integrated circuit (PMIC), a charger integrated circuit (IC), or a battery or fuel gauge. The PMIC may have a wired and/or wireless charging scheme. Examples of the wireless charging method may include a magnetic resonance scheme, a magnetic induction scheme, or an electromagnetic scheme, and an additional circuit for wireless charging, such as a coil loop circuit, a resonance circuit, a rectifier circuit, and the like, may be further included. The battery gauge may measure, for example, a residual quantity of the battery 1096, or a voltage, a current, or a temperature while charging. The battery 1096 may include, for example, a rechargeable battery or a solar battery.

The indicator 1097 may indicate a specific state of the electronic device 1001 or a part thereof (e.g., the processor 1010), such as a boot-up state, a message state, a charging state, and the like. The motor 1098 may convert an electric signal into a mechanical vibration, and may generate a vibration or haptic effect. Although not illustrated, the electronic device 1001 may include a processing unit (e.g., a GPU) for mobile TV support. The processing unit for mobile TV support may process media data, for example, according to a standard of digital multimedia broadcasting (DMB), digital video broadcasting (DVB), media flow, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 11:
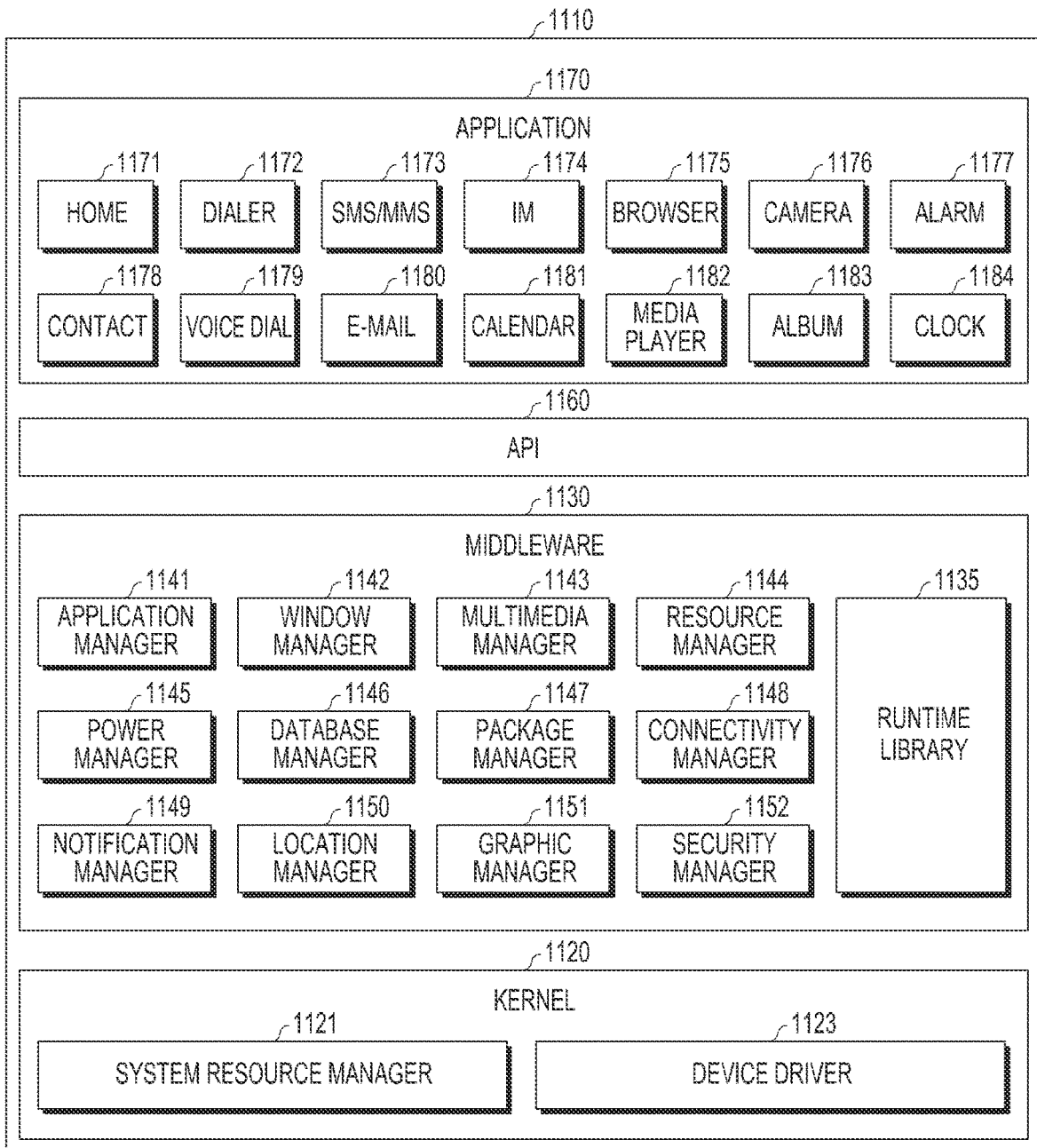
FIG. 11 is a block diagram of an electronic device according to various embodiments of the present disclosure.

FIG. 11 is a block diagram of a program module according to various embodiments of the present disclosure.

Referring to FIG. 11, a program module 1110 (e.g., the program 240) may include an OS) for controlling resources related to an electronic device (e.g., the electronic device 201) and/or various applications (e.g., the application programs 247) driven in the operating system. The OS may be, for example, Android, iOS, Windows, Symbian, Tizen, Bada, and the like.

The program module 1110 may include a kernel 1120, middleware 1130, an API 1160, and/or applications 1170. At least a part of the program module 1110 may be preloaded on the electronic device or downloaded from an external electronic device (e.g., the electronic device 202, 204, 206, or 208).

The kernel 1120 (e.g., the kernel 241) may include, for example, a system resource manager 1121 and/or a device driver 1123. The system resource manager 1121 may control, assign, or collect system resources. According to an embodiment, the system resource manager 1121 may include a process manager, a memory manager, or a file system manager. The device driver 1123 may include, for example, a display driver, a camera driver, a Bluetooth driver, a shared-memory driver, a USB driver, a keypad driver, a Wi-Fi driver, an audio driver, or an inter-process communication (IPC) driver.

The middleware 1130 may, for example, provide a function commonly required by the applications 1170, or may provide various functions to the applications 1170 through the API 1160 so that the applications 1170 may efficiently use limited system resources within the electronic device. According to an embodiment, the middleware 1130 (e.g., the middleware 143) may include, for example, at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135 may include, for example, a library module that a compiler uses in order to add new functions through a programming language while the applications 1170 are executed. The runtime library 1135 may perform input/output management, memory management, or a function for an arithmetic function.

The application manager 1141 may, for example, manage a life cycle of at least one of the applications 1170. The window manager 1142 may manage GUI resources used on a screen. The multimedia manager 1143 may identify formats required for the reproduction of various media files and encode or decode a media file using a codec suitable for the corresponding format. The resource manager 1144 may manage resources of at least one of the applications 1170, such as a source code, a memory, and a storage space.

The power manager 1145 may, for example, operate together with a basic input/output system (BIOS) to manage a battery or power, and may provide power information required for the operation of the electronic device. The database manager 1146 may generate, search, or change a database to be used in at least one of the applications 1170. The package manager 1147 may manage the installation or the updating of an application distributed in the form of a package file.

The connectivity manager 1148 may, for example, manage wireless connection such as Wi-Fi or Bluetooth. The notification manager 1149 may display or notify of an event, such as an arrival message, an appointment, proximity notification, and the like, in such a manner of not disturbing a user. The location manager 1150 may manage location information of the electronic device. The graphic manager 1151 may manage a graphic effect to be provided to a user and a user interface relating to the graphic effect. The security manager 1152 may provide all security functions required for system security or user authentication. According to an embodiment, in cases where an electronic device (e.g., electronic device 201) includes a telephone call function, the middleware 1130 may further include a telephony manager for managing a voice or video call function of the electronic device.

The middleware 1130 may include a middleware module that forms combinations of various functions of the above described elements. The middleware 1130 may provide specialized modules according to types of operating systems in order to provide differentiated functions. Furthermore, the middleware 1130 may dynamically remove some of the existing elements, or may add new elements.

The API 1160 (e.g., the API 245) may be, for example, a set of API programming functions and may have different configurations according to operating systems. For example, in the case of Android or iOS, one API set may be provided for each platform, and in the case of Tizen, two or more API sets may be provided for each platform.

The applications 1170 (e.g., the application programs 247) may include, for example, one or more applications that may perform functions such as a home 1171, dialer 1172, a SMS/MMS 1173, an IM 1174, a browser 1175, a camera 1176, an alarm 1177, contacts 1178, a voice dialer 1179, an e-mail 1180, a calendar 1181, a media player 1182, an album 1183, a clock 1184, a health care (e.g., measuring a work rate or blood sugar), or providing environment information (e.g., atmospheric pressure, humidity, or temperature information).

According to an embodiment, the applications 1170 may include an application (hereinafter, for convenience of description, referred to as an "information exchange application") for supporting information exchange between an electronic device (e.g., the electronic device 201) and an external electronic device (e.g., the electronic device 202, 204, 206, or 208). The information exchange application may include, for example, a notification relay application for relaying specific information to the external electronic device or a device management application for managing the external electronic device.

For example, the notification relay application may include a function of relaying notification information generated in other applications of the electronic device (e.g., an SMS/MMS application, an e-mail application, a health management application, or an environmental information application) to the external electronic device (e.g., the electronic device 202, 204, 206, or 208). Furthermore, the notification relay application may, for example, receive notification information from the external electronic device and provide the received notification information to a user.

The device management application may manage (e.g., install, delete, or update), for example, at least one function of the external electronic device (e.g., the electronic device 202, 204, 206, or 208) communicating with the electronic device (e.g., turning on/off the external electronic device itself (or some elements thereof) or adjusting the brightness (or resolution) of a display), applications executed in the external electronic device, or services provided from the external electronic device (e.g., a telephone call service or a message service).

According to an embodiment, the applications 1170 may include applications (e.g., a health care application of a mobile medical appliance, and the like) specified according to attributes of the external electronic device (e.g., the electronic device 202, 204, 206, or 208). According to an embodiment, the applications 1170 may include applications received from an external electronic device (e.g., a server or the electronic device 202, 204, 206, or 208). According to an embodiment, the applications 1170 may include a preloaded application or a third party application that may be downloaded from a server. The names of the elements of the program module 1110, according to the illustrated embodiment, may vary with the types of operating systems.

According to various embodiments, at least a part of the program module 1110 may be implemented by software, firmware, hardware, or a combination of two or more thereof. At least a part of the program module 1110 may be implemented (e.g., executed), for example, by a processor (e.g., the processor 1010). At least a part of the program module 1110 may include, for example, a module, a program, a routine, sets of instructions, or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 220), may cause the one or more processors to execute the function corresponding to the instruction. The computer-readable storage medium may be, for example, the memory 230.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Further, the embodiments disclosed in this document are only for the description and understanding of technical contents and do not limit the scope of the present disclosure. Accordingly, the scope of the present disclosure should be construed as including all modifications or various other embodiments based on the technical idea of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling an electronic device comprising:
   receiving a request for providing a service;
   based on receiving the request, performing a first function associated with a first part of the service when the electronic device does not support at least another part of the service;
   receiving information related to a plurality of external devices associated with a location of the electronic device from a server, wherein the plurality of external devices are capable of performing a plurality of functions related to the at least another part of the service;
   displaying the information related to the plurality of external devices;
   based on receiving a user input for performing a second function associated with a second part of the service among the plurality of functions while the electronic device performs the first function, transmitting a request message such that at least one external device performs the second function; and
   maintaining to perform the first function while the at least one external device performs the second function such that the first part of the service and the second part of the service are provided simultaneously.

2. The method of claim 1, wherein the transmitting of the request message is further based on a location of the at least one external device and the location of the electronic device.

3. The method of claim 1, further comprising:
   identifying the second function based on a state information of at least one of the electronic device or the at least one external device.

4. The method of claim 3, wherein the state information comprises at least one of a user, authority, a priority, performance, available power, an available storage space, a communication speed, a travelling speed, a locking state, or an executed application.

5. The method of claim 3, wherein the state information comprises a type of at least one of the electronic device or the at least one external device.

6. The method of claim 1, further comprising:
   identifying the second function based on specified content acquired in regard to the first part of the service.

7. The method of claim 1, further comprising:
   receiving an information acquired from the at least one external device; and
   transmitting the acquired information to another external device connected to the electronic device.

8. An electronic device comprising:
   a memory configured to store instructions therein,
   at least one processor configured, upon execution of the instructions, to:
      receive a request for a service,
      based on receiving the request, perform a first function associated with a first part of the service when the electronic device does not support at least another part of the service,
      receive information related to a plurality of external devices associated with a location of the electronic device from a server, wherein the plurality of external devices are capable of performing a plurality of functions related to the at least another part of the service,
      display the information related to the plurality of external devices,
      based on receiving a user input for performing the second function associated with the second part of the service among the plurality of functions while the electronic device performs the first function, transmit a request message such that the at least one external device performs the second function, and maintain to perform the first function such that the first part of the service and the second part of the service are provided simultaneously.

9. The electronic device of claim 8, wherein the at least one processor is further configured, upon execution of the instructions, to:

transmit the request message based on a location of the at least one external device or the location of the electronic device.

10. The electronic device of claim 8, wherein the at least one processor is further configured, upon execution of the instructions, to:

identify the second function based on a state information of at least one of the electronic device or the at least one external device.

11. The electronic device of claim 10, wherein the state information comprises a type of at least one of the electronic device or the at least one external device.

12. The electronic device of claim 10, wherein the state information comprises a type of an additional electronic device connected to the at least one external device, or a service providing state of the at least one external device for the additional electronic device.

13. The electronic device of claim 8, wherein the at least one processor is further configured, upon execution of the instructions, to:

identify the second function based on specified content acquired in regard to the first part of the service.

14. The electronic device of claim 8, wherein the first part of the service comprises voice information, and the request for the service comprises the voice information and video information.

15. A non-transitory computer readable storage medium having stored thereon a program, the program executed by at least one processor to perform a method, the method comprising:

receiving a request for providing a service;

based on receiving the request, performing a first function associated with a first part of the service when an electronic device does not support at least another part of the service;

receiving information related to a plurality of external devices associated with a location of the electronic device from a server, wherein the plurality of external devices are capable of performing a plurality of functions related to the at least another part of the service;

displaying the information related to the plurality of external devices;

based on receiving a user input for performing a second function associated with a second part of the service among the plurality of functions while the electronic device performs the first function, transmitting a request message such that at least one external device performs the second function; and maintaining to perform the first function while the at least one external device performs the second function such that the first part of the service and the second part of the service are provided simultaneously.

16. The non-transitory computer readable storage medium of claim 15, wherein the method further comprises:

identifying the second function based on state information of at least one of the electronic device or the at least one external device.

17. The electronic device of claim 8, wherein the memory is further configured to:

store first function information related to the first function or second function information related to the second function.

* * * * *